(12) United States Patent
Kageyama

(10) Patent No.: US 6,681,157 B2
(45) Date of Patent: *Jan. 20, 2004

(54) VEHICLE INTERFERENCE PREVENTION DEVICE

(75) Inventor: Masato Kageyama, Oyama (JP)

(73) Assignee: Komatsu Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/577,004

(22) Filed: May 25, 2000

(65) Prior Publication Data

US 2002/0165645 A1 Nov. 7, 2002

(30) Foreign Application Priority Data

May 31, 1999 (JP) .......................... 11-152026

(51) Int. Cl.$^7$ ............................. G06F 7/00
(52) U.S. Cl. ........................................ 701/1
(58) Field of Search ................ 701/1–4, 7–9, 701/19–26, 50, 93–96, 116–117, 120–122, 200–203, 207–215, 225, 300–302; 340/425.5, 431, 435–437, 825.36, 901–903, 961, 988–994; 342/29–30, 41–42, 61–65, 70–72, 356, 357.06, 357.09, 357.12, 454–458

(56) References Cited

U.S. PATENT DOCUMENTS

| | | | |
|---|---|---|---|
| 4,653,002 A | * 3/1987 | Barry | 701/23 |
| 5,574,463 A | * 11/1996 | Shirai et al. | 342/70 |
| 5,574,469 A | * 11/1996 | Hsu | 342/455 |
| 5,757,287 A | * 5/1998 | Kitamura et al. | 340/937 |
| 5,872,526 A | * 2/1999 | Tognazzini | 340/961 |
| 5,907,293 A | * 5/1999 | Tognazzini | 340/903 |
| 5,919,242 A | * 7/1999 | Greatline et al. | 701/50 |
| 5,926,117 A | * 7/1999 | Gunji et al. | 340/988 |
| 5,952,940 A | * 9/1999 | Matsumoto | 340/905 |
| 6,017,102 A | * 1/2000 | Aga | 303/191 |
| 6,133,867 A | * 10/2000 | Eberwine et al. | 342/29 |
| 6,243,647 B1 | * 6/2001 | Berstis et al. | 701/213 |

* cited by examiner

Primary Examiner—Thu Nguyen
(74) Attorney, Agent, or Firm—Varndell & Varndell, PLLC

(57) ABSTRACT

There is provided a vehicle interference prevention device that, by computing a range of possible locations of a vehicle taking into consideration the time at which the location of the vehicle is measured, can safely predict the location of the vehicle, even with minimal frequency of radio contact, and prevent interference among unmanned vehicles or manned vehicles over the entirety of large work site. An unmanned vehicle uses the latest position data for a manned vehicle acquired (received) via an inter-vehicle communication device to determine a position (position at a certain point in time) as the basis for computing a circle having this position as its center and having a radius equal to the distance traveled at maximum speed from this point to a predetermined future point in time, and designates the area within this circle on a prearranged travel route as a range of possible locations for the manned vehicle. The unmanned vehicle then decides whether its own vehicle position interferes with this circle.

7 Claims, 17 Drawing Sheets

- 10 OWN VEHICLE
- 11 OTHER VEHICLE (MANNED VEHICLE)
- 60 PREARRANGED TRAVEL ROUTE
- 70 MANNED VEHICLE RANGE OF POSSIBLE LOCATIONS

- 10 OWN VEHICLE
- 11 OTHER VEHICLE (MANNED VEHICLE)
- 60 PREARRANGED TRAVEL ROUTE
- 71 MANNED VEHICLE RANGE OF POSSIBLE LOCATIONS

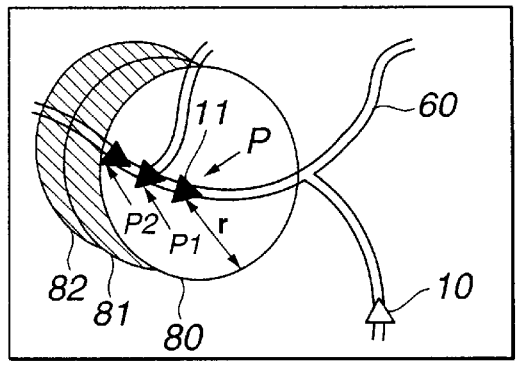

- 10 OWN VEHICLE
- 11 OTHER VEHICLE (MANNED VEHICLE)
- 60 PREARRANGED TRAVEL ROUTE
- 80 RANGE OF POSSIBLE LOCATIONS FOR OTHER VEHICLE (ESCORT VEHICLE)
- 81,82 RANGE OF POSSIBLE LOCATIONS FOR ESCORTED VEHICLE

FIG.16

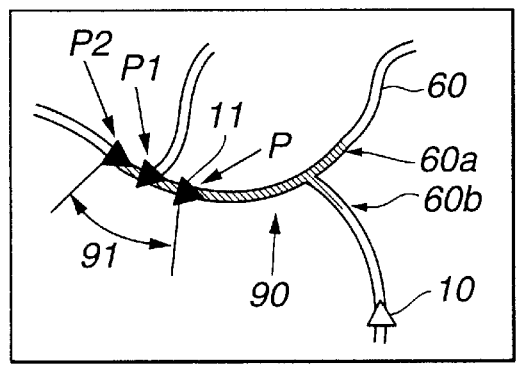

- 10 OWN VEHICLE
- 11 OTHER VEHICLE (MANNED VEHICLE)
- 60 PREARRANGED TRAVEL ROUTE
- 90 RANGE OF POSSIBLE LOCATIONS FOR OTHER VEHICLE (ESCORT VEHICLE)
- 91 RANGE OF POSSIBLE LOCATIONS FOR ESCORTED VEHICLE

FIG.17

VEHICLE INTERFERENCE PREVENTION DEVICE

BACKGROUND OF THE INVENTION

1. Field of the Invention

The present invention relates to a vehicle interference prevention device for preventing vehicles from interfering with one another in situations where a plurality of vehicles are traveling over travel routes.

2. Description of the Related Art

At large work sites such as rock quarries and mining operations, control of a plurality of unmanned vehicles, such as unmanned dump trucks, used to perform operations such as hauling earth is typically accomplished through a vehicle monitoring system in which a monitoring station is set up as a base station, with all of the unmanned vehicles being managed and monitored by this monitoring station.

Vehicle monitoring systems of this type known in the art include the systems disclosed in Japanese Patent Application Laid-Open No. 63-150710 (hereinbelow referred to as Citation 1) and Japanese Patent Application Laid-Open No. 10-69599 hereinbelow referred to as Citation 2), as well as in the Applicant's co-pending Japanese Patent Application No. 9-27960 (hereinbelow referred to as Citation 3), Japanese Patent Application No. 9-36324 (hereinbelow referred to as Citation 4), and Japanese Patent Application No. 9-86612 (hereinbelow referred to as Citation 5).

According to the system disclosed in Citation 1, there is provided a predetermined operation whereby, in the event of a risk of collision between any of a plurality of unmanned vehicles, the unmanned vehicles at risk for collision may exchange necessary information with each other via communication devices so as to avoid collision.

According to the system disclosed in Citation 2, lane-change sensors provided with optical means are embedded in the road surface of a highway at the boundary between an automatically guided vehicle lane L1 and an adjacent travel lane L2, so that in the event that a vehicle traveling in lane L2 should enter lane L1 (i.e., make a lane change) the control system, on the basis of signals from the lane-change sensors, will control any automatically guided vehicle traveling behind the vehicle which has entered the lane in such a way as to provide greater distance between vehicles.

According to the system disclosed in Citation 3, long-range (e.g. VHF) communication devices are provided to a plurality of unmanned vehicles and to a monitoring station, the plurality of unmanned vehicles being provided also with short-range (e.g. SS transmission) communication devices, whereby travel instruction data may be transmitted from the monitoring station to the unmanned vehicles via the long-range communication devices, while the unmanned vehicles may exchange vehicle position data among themselves using the short-range communication devices, thereby allowing for monitoring of positional relationships among the vehicles.

According to the system disclosed in Citation 4, an arranged route of travel is divided into a plurality of segments, and a plurality of vehicles, via communication devices provided thereto, transmit to a monitoring station vehicle position data and the like which has been ascertained by position-measuring devices, transmitting this information each time that a vehicle reaches a segment boundary on an arranged route of travel, whereby the monitoring station may ascertain positional relationships among a plurality of vehicles in each segment, and monitor and control the plurality of vehicles with reference to these positional relationships. In order to prevent interference between manned vehicles and unmanned vehicles, for example, the monitoring station will forcibly halt or decelerate a manned vehicle in the event that the manned vehicle does not obey instruction data (data instructing deceleration, a stop, etc.).

According to the system disclosed in Citation 5, vehicle position data is exchanged via communication devices among a plurality of vehicles, for example, manned vehicles and unmanned vehicles, whereby vehicles, on the basis of vehicle position data for other vehicles, perform control so as to prevent interference among vehicles. In this system, in the event of a determination, made on the basis of vehicle position data exchanged between a manned vehicle and an unmanned vehicle, that the vehicles are interfering with one another, control is effected such that the unmanned vehicle comes to an emergency stop while the manned vehicle is decelerated so as to prevent interference among the vehicles.

The systems disclosed in Citation 1 and Citation 3, however, are directed to preventing interference among unmanned vehicles and make no mention whatsoever of preventing interference among manned vehicles and unmanned vehicles.

The system disclosed in Citation 2 employs a stationary installation (i.e. a highway), detecting vehicles entering the lane traveled by automatically guided vehicles and decelerating the automatically guided vehicles. However, the use of a stationary installation entails numerous initial outlays associated with construction of the installation. Further, it is difficult to adapt such a system to a mine, where travel routes change frequently.

While it is possible to embed lane change sensors along the course of an asphalt highway, this approach is not feasible for mine roads, which are maintained by graders.

Specifically, the off-road dump trucks used in mining operations, even those of ordinary size, have vehicle weights of several hundred tons when loaded, while larger vehicles can weigh in at close to 700 tons. Even if lane change sensors were embedded in an asphalt travel path (roadway), the asphalt road would not be able to bear the weight of the vehicle. Also, lane change sensors embedded in the roadway would be crushed by the weight of the vehicle.

Accordingly, it is common practice in mining operations and the like to pave roads with gravel. Assuming that lane change sensors were embedded in road paved with gravel or the like, the need to periodically maintain the pavement through grading poses the problem of equipment, such as lane change sensors, embedded in the pavement being crushed during the grading operation.

Further, lane change sensors can detect a vehicle only after it has entered a lane; while this presents no particular problem in the case of highways and other roadways with minimal cross-traffic, in mining operations, which typically have a complex web of routes, there exists a risk, depending on the condition of travel of a vehicle, that the vehicle will be detected only as it approaches an intersection. This means that where the risk exists that traveling vehicles will interfere (collide) in proximity to an intersection, the delay in control to prevent collision may result in collision of the vehicles.

The system disclosed in Citation 4 assumes travel of manned vehicles over a predetermined course (prearranged travel route) in a manner analogous to unmanned vehicles, with monitoring and control being performed from a central monitoring station, and as such is difficult to implement in situations where the human operator of a vehicle may choose, for example, to make a U-turn mid-course or otherwise change course from time to time. Further, manned vehicles are driven by human operators, and some operators may find disagreeable the approach of travel to a predetermined destination selected in accordance with the operation. Forcible introduction of a system that ignores operator preference will have a negative impact on operations.

According to the system disclosed in Citation 5, interference among vehicles may be prevented even in situations where manned vehicles coexist with unmanned vehicles. However, depending on communication conditions, it may occur that an unmanned vehicle cannot receive vehicle position data from a manned vehicle; in such instances, there exists the risk of a delay in the determination process for interference between vehicles, resulting in an inability exercise proper control to prevent interference between vehicles.

For manned vehicles, in instances of interference between vehicles, while a Reduce Speed command sent from the unmanned vehicle is displayed on the display screen of a display device, it is not possible to ascertain the positional relationship vis-à-vis the other vehicle. That is, if the position of one's vehicle relative to the other vehicle could be displayed in real time, it would be possible to determine before the fact if a given current course of travel is likely to result in interference between vehicles, for example, thereby making it possible to avoid interference between vehicles. This is not possible with the system disclosed in Citation 5, however.

The systems disclosed in Citation 1 and Citations 3 to 5 presume that position-measuring devices and communication devices are provided to all vehicles (both unmanned vehicles and manned vehicles) operating in a large work site such as a mining operation, but providing position-measuring devices and communication devices to all vehicles requires a significant initial outlay. There are also various costs associated with equipping vehicles that do not enter the mine, such as repair vehicles, with position-measuring devices and communication devices.

Position-measuring devices and communication devices that are used infrequently have increased likelihood of malfunction when it is attempted to operate the device. While it is possible to design position-measuring devices and communication devices to be readily attachable and detachable, in some instances there may be an insufficient number of devices.

From the standpoint of preventing vehicle interference, that is, for reasons of vehicle safety, vehicles lacking position-measuring devices and communication devices due to malfunction or a shortage thereof cannot be employed. This means that despite the availability of vehicles to do the work, the vehicle resources cannot be used effectively.

In the vehicle monitoring systems of the Citations cited above, the radio waves used for communications of the short-range (e.g. SS transmission) communication devices used for communication among vehicles can only travel over short distances (from 100 m to 1 km), and in large-scale mining operations involving large distances between vehicles and large numbers of vehicles (50 to 100, for example), it is not possible for all vehicles to know the current positions of other vehicles.

With the conventional vehicle monitoring systems described above, while long-range (10 km to 20 km) communications are possible if long-range (e.g. VHF) communication devices are used, slow transmission speed (9600 bps) creates the problem of inability to constantly be apprised of the current locations of a multitude of vehicles. Since large amounts of data are transmitted to the monitoring station from the multitude of vehicles, the volume of data being transmitted is quite large. Since the communications format entails slow transmission speeds, the communications circuit becomes complicated and the communications circuit becomes overloaded, resulting in inability in actual practice to manage and monitor vehicles.

Where it is attempted to address this problem by employing short-range communication devices capable of higher transmission speeds (256 kbps) for communication among vehicles, while it becomes possible to transmit very large amounts of data rapidly, the limited range of the radio waves makes it impossible to provide full communications coverage over the entirety of large work site. Thus, of the vehicles spread over entirety of a large work site, it will not be possible for a vehicle to communicate with another vehicle located a distance away that exceeds the short range transmission range (100 m to 1 km, for example), and hence there will be no way to determine the current position of this other vehicle.

Accordingly, in large-scale mining operations involving large distances between vehicles and large numbers of vehicles, it has not been possible for all vehicles to be constantly apprised of the current locations of other vehicles.

With the foregoing in view, it is an object of the present invention to provide a vehicle interference prevention device that, by computing a range of possible locations of a vehicle taking into consideration the time at which the location of the vehicle is measured, can safely predict the location of the vehicle, even with minimal frequency of radio contact, and prevent interference among unmanned vehicles or manned vehicles over an entire large work site.

SUMMARY OF THE INVENTION

According to the invention of claim 1, the object is achieved through a vehicle interference prevention device for preventing interference among vehicles where a plurality of vehicles are traveling over a travel route, wherein each of the plurality of vehicles comprises:

measuring means for measuring a position of its own vehicle;

communication means for exchanging with other vehicles, in a wireless communications format, position information indicating the position of its own vehicle, as measured by the measuring means;

estimating means for estimating a likelihood of interference between its own vehicle and other vehicle on the basis of position information for the other vehicle received via the communication means, time information indicating a reception time at which the position information is received, and the position information for its own vehicle; and control means for performing a preset control routine in the event that interference is predicted by the estimating means, so as to avoid interference with the other vehicle.

According to the second invention, in the vehicle interference prevention device of the first invention, the communication means comprises:

means for transmitting and receiving vis-à-vis other vehicles, in a wireless communications format, position information indicating vehicle position, as measured by its own measuring means, and time information indicating a time of measurement of the vehicle position or time information indicating a time of transmission of the position information; and the estimating means comprises:

means for estimating the likelihood of interference between its own vehicle and other vehicle on the basis of the position information for the other vehicle received via the transmitting/receiving means, the time information for either the measurement time or the transmission time, and the position information for its own vehicle.

According to the third invention, in the vehicle interference prevention device of the first invention or the second invention, the estimating means comprises:

first estimating means for estimating, on the basis of the position information and the time information for other vehicle received via the communication means, a future position of the other vehicle at a point in time coming a predetermined time interval after the time, or a range of movement of the other vehicle;

second estimating means for estimating from its current position on the basis of position information for its own vehicle a future position of its own vehicle at a point in time coming a predetermined time interval later, or a range of movement of its own vehicle; and decision means for deciding if the future position or range of movement of the other vehicle estimated by the first estimating means overlaps the current position or future position of its own vehicle estimated by the second estimating means.

According to the fourth invention, in the device of first invention, second invention, or third invention, each of the plurality of vehicles further comprises processing means that, during power-on of its own vehicle, notifies other vehicle that its own vehicle has started up, and in the event that no response to the notification is received by its own communication means, makes a determination that the communication means of the other vehicle is not functioning normally, and places its own vehicle in standby mode at its current position.

The first through third invention are now described making reference to the attached drawings.

To prevent interference among vehicles, the range of possible locations for other manned vehicles can be calculated by an unmanned vehicle or manned vehicle in the following manner, for example.

Method 1: Circle Computation Method

Referring to FIG. 6, an own vehicle (either an unmanned vehicle or a manned vehicle), for example, unmanned vehicle 10, uses the last-acquired position data P (position at a certain point in time) for a manned vehicle (other vehicle) for example, manned vehicle 11), acquired (received) via inter-vehicle communication device 6 shown in FIGS. 2, 3 and 4 as the basis for computing a circle 70 having position P as its center and having a radius r equal to the distance traveled at maximum speed from point P to a predetermined future point in time, and designates the area within this circle 70 on prearranged travel route 60 as range of possible locations for manned vehicle 11.

Method 2: Course Computation Method

Referring to FIG. 7, an own vehicle (either an unmanned vehicle or a manned Vehicle), for example, unmanned vehicle 10, uses the last-acquired position data P (position at a certain point in time) and direction information (direction of progress indicated in the figure by →) for a manned vehicle acquired (received) via inter-vehicle communication device 6 as the basis for computing positions on an prearranged travel route 60 course), for example, position 60a and position 60b on prearranged travel route 60—assuming movement of the manned vehicle at maximum speed from point P to a predetermined future point in time—and designates the area between point P and positions 60a, 60b (crosshatched area in the figure) 71 as the range of possible locations for the manned vehicle.

The own vehicle respectively computes, for example, 5-second-ahead and 15-second-ahead ranges of possible locations for itself and for the other vehicle, and determines for each of these whether these range of possible locations interfere with each other. In the event that the 15-second-ahead range of possible locations interfere, the vehicle (unmanned vehicle 10, for example) makes a determination as to whether the reception time of position data for the other vehicle is older than predetermined time interval (30 seconds or more, for example) (STEP 304 in FIG. 11), and where this predetermined time interval (30 seconds, for example) has already passed, the vehicle at risk for interference is requested directly for position information by UHF transmission via the inter-vehicle communication device 6 shown in FIGS. 2, 3 and 4 (STEP 305 in FIG. 11).

On the other hand, in the event that the 5-second-ahead range of possible locations interfere, travel of the vehicle (unmanned vehicle 10, for example) is controlled by a vehicle control device 44 so as to stop as quickly as possible (STEP 406).

According to the first to third inventions described above, a vehicle, on the basis of position information for itself, position information transmitted to it from another vehicle, and time information (either the reception time, position measurement time, or transmission time for this position information), estimates the likelihood of interference between itself and another vehicle, and performs appropriate control on the basis of this estimate so as to avoid interference between the vehicles.

Specifically, from the current position of other vehicle, an estimate is made of a range of movement for the other vehicle at a point in time having passed a predetermined time interval form the time based on the time information, thus allowing a determination to be made as to whether the estimated range of movement of the other vehicle interferes with its own vehicle, the time interval between transmissions of position data over long distances can be increased, thereby reducing the load on the communications circuit.

The fourth invention is now described making reference to FIG. 9.

At power-on, a vehicle controller 55 provided to manned vehicle 11 enters a malfunction detection mode, at which time a Power-on signal and Vehicle ID for manned vehicle 11 are transmitted to a monitoring station 20 through UHF transmission via a monitoring station/vehicle communication device 5 (S11). Through UHF transmission via a monitoring station/vehicle communication device 23, monitoring station 20 transmits to all vehicles powered-up at that time (unmanned vehicles 10 and 12 in this example) the Vehicle ID for the newly powered-up manned vehicle 11 and a signal indicating that "manned vehicle 11 has powered up" (S12). In the event that an acknowledging signal is received, for example, from unmanned vehicle 12 (S13) whereas no acknowledging signal is received from unmanned vehicle 10 after a predetermined time interval TA has passed, Warning information is transmitted to manned vehicle 11 (S14), and the same signal (namely, the same signal as in S12) is re-transmitted to both unmanned vehicles 10 and 12 or to the vehicle failing to respond, here, unmanned vehicle 10 (S15).

When manned vehicle 11 receives Warning information, it recognizes that the vehicle communication devices 5, 6 of some or all of the other vehicles currently in operation (traveling) are not functioning normally, and goes into standby at its current position.

According to the fourth invention, the processing means of a vehicle that has powered up transmits to other vehicles identifying information that identifies its own vehicle and notification that its own vehicle has powered up, and in the event that no response is received, recognizes that there is a malfunction with the communications means of the other vehicle or vehicles, and places its own vehicle in standby mode at its current position. In this way, the powered-up own vehicle will commence travel only after verifying that it is safe to do so, so as to avoid colliding or otherwise interfering with other vehicles.

According to the fifth invention, there is provided a vehicle interference prevention device having an unmanned vehicle comprising vehicle position-measuring means for measuring a position of its own vehicle and traveling over a travel route based on predetermined instruction data, a first manned vehicle having position-measuring means for measuring a position of its own vehicle, and a second manned vehicle traveling over the travel route guided by the first manned vehicle;

wherein the unmanned vehicle and the first manned vehicle each comprises communication means for transmitting and receiving predetermined information among themselves;

the first manned vehicle transmits to the unmanned vehicle via the communication means a mode which is either a guiding mode wherein the second manned vehicle is guided, or a non-guiding mode wherein the second manned vehicle is not guided; and transmits to the unmanned vehicle via the communication means position information indicating the vehicle position determined by the position-measuring means; and the unmanned vehicle, in the event that the mode received via the communication means is the non-guiding mode, is controlled, on the basis of the position information from the first manned vehicle, in such a way as to avoid entering an area of a given range that includes a current position of the first manned vehicle; whereas in the case of the guiding mode, it is controlled, on the basis of the position information from the first manned vehicle, in such a way as to avoid entering the current position of the first manned vehicle and an area of a given range lying to a rear of the first manned vehicle.

According to the sixth invention, the vehicle interference prevention device of the fifth invention, further comprises a monitoring station having transmitting/receiving means for transmitting and receiving predetermined information to and from the unmanned vehicle and the first manned vehicle; and the monitoring station further comprises means for transmitting to the unmanned vehicle via the transmitting/receiving means instruction data designating as a permissible travel range over which travel is permitted an area on the travel route such that the most recent position of the unmanned vehicle, based on the position information measured by the vehicle position-measuring means and received via the transmitting/receiving means, does not interfere with a predicted range of motion for the first manned vehicle, as calculated on the basis of the most recent position information for the first manned vehicle received via the transmitting/receiving means.

According to the seventh invention, in the vehicle interference prevention device of the sixth invention, the transmitting means, in the event that the first manned vehicle is currently in the guiding mode, excludes from the permissible travel range a predicted range for the second manned vehicle that is obtained on the basis of the position information for the second manned vehicle based on the position information for the first manned vehicle, and transmits to the unmanned vehicle instruction data designating an area of this range as a new permissible travel range.

According to the eighth invention, in the vehicle interference prevention device of the fifth invention, the unmanned vehicle comprises:

measuring means for measuring the position of its own vehicle;

decision means for deciding, on the basis of the position information from the first manned vehicle received from the communication means and position information indicating the position of its own vehicle as measured by the measuring means, whether its own vehicle poses interference with the first manned vehicle or with an area of a predetermined range extending from the position of the manned vehicle; and control means that, in the event that the decision means decides that interference is present, halts or decelerates its own vehicle.

The fifth through eighth inventions are now described making reference to FIGS. 16 and 17.

Let it be assumed that the vehicle computing a vehicle range of possible locations is an unmanned vehicle (unmanned vehicle 10, for example; in actual practice, it does not matter if the vehicle is a manned vehicle or unmanned vehicle), and that the other vehicle whose range of possible locations is being computed is a manned vehicle {escort vehicle (manned vehicle 11, for example) only, or an escort vehicle plus an escorted vehicle (such as a repair vehicle)}.

Methods for calculating a range of possible locations for a vehicle include the following two, for example.

Method 1: Circle Computation Method

Referring to FIG. 16, on the basis of position data indicating the last reported vehicle position P (latest position data), unmanned vehicle 10 designates as a range of possible locations for escort vehicle 11 a circle 80 of radius r equivalent to the distance over which the latter vehicle can travel at maximum speed from vehicle position P.

The range of possible locations for the escorted vehicle consists of an area defined by circle 80 and circles 81, 82 of radii equal to the distances traveled at maximum speed from a point P1, lying within a predetermined distance from position P—which represents the last reported vehicle position for which information has been received from escort vehicle 11—defined as the escort area, and another point P2, respectively.

Method 2: Course Computation Method

Referring to FIG. 17, on the basis of position data indicating the last reported vehicle position P (latest position data) received via the inter-vehicle communication device 6, unmanned vehicle 10 computes positions 60a, 60b on prearranged travel route 60 assuming movement of the manned vehicle at maximum speed along the prearranged travel route up to a predetermined future point in time, and designates as the range of possible locations for the escort vehicle the area 90 on the prearranged travel route lying between these positions 60a, 60b and the last reported vehicle position P.

The range of possible locations for the escorted vehicle 11 is determined by computing positions on the travel route assuming travel at maximum speed from a point P1—lying within a predetermined distance defined as the escort area from position P which represents the last reported vehicle position for which information has been received from escort vehicle, and another point P2, respectively, and adding these to area 90, previously computed on the basis of point P.

Unmanned vehicle 10, which computes a range of possible locations for the manned vehicle in the preceding manner, is provided by monitoring station 20 with the Vehicle ID and mode information for the manned vehicle, as well as instruction data reflecting this mode information. Unmanned vehicle 10 is controlled by monitoring station 20 so as to prevent it from entering the range of possible locations for the manned vehicle.

Specifically, where the escort vehicle (manned vehicle 11) is in non-escort mode, unmanned vehicle 10 is controlled so as to prevent it from entering range of possible locations 80 computed using Method 1, or range of possible locations 90 computed using Method 2; whereas in escort mode, it is controlled so as to prevent it from entering range of possible locations 80 and range of possible locations 81, 82 computed using Method 1, or range of possible locations 90 and range of possible locations 91 computed using Method 2.

As will be apparent from the preceding description, according to the fifth through eighth inventions, a second manned vehicle lacking position-measuring means for measuring the position of its own vehicle and communication means for transmitting to an unmanned vehicle position data indicating the vehicle position determined thereby is guided by a first manned vehicle equipped with position-measuring means and communication means, whereby the manned vehicle lacking position-measuring means and communication means may be conducted safely about a large work site such as a mining operation.

In the event that the position-measuring means and communication means of a first manned vehicle should fail to function properly due to malfunction or the like, the first manned vehicle may nevertheless be conducted safely about a large work site guided by another first manned vehicle.

According to the ninth invention, there is provided a vehicle interference prevention device for preventing interference among a plurality of vehicles, including at least one manned vehicle, as they travel along a travel route, wherein each of the plurality of vehicles comprises:

measuring means for measuring a position of its own vehicle; and communication means for exchanging with other vehicles position information indicating the vehicle position measured by the measuring means;

and the manned vehicle comprises:

processing means for calculating relative positional relationship of its own vehicle and other vehicle on the basis of position information for the other vehicle received via the communication means, and position information for its own vehicle; and notifying means for notifying predetermined information depending on the relative positional relationship calculated by the processing means.

According to the tenth invention, in the vehicle interference prevention device of the ninth invention, wherein the notifying means comprises display means for visually displaying the relative positional relationship.

According to the eleventh invention, in the vehicle interference prevention device of the ninth invention or tenth invention, the notifying means provides a warning in the event that the relative positional relationship is such that its own vehicle and the other vehicle are in close proximity and interfering.

According to the twelfth invention, in the vehicle interference prevention device of the ninth invention, the plurality of vehicles further comprises:

transmitting/receiving means for exchanging with other vehicle time information indicating either of a time at which the vehicle position was measured by the measuring means of its own vehicle, or a time at which position information indicating this vehicle position was transmitted; and all of the manned vehicles including at least one manned vehicle further comprise:

range estimating means for estimating, on the basis of position information for other vehicle received via its own communication means, and either time information for this position information indicating the time at which the position information was received by the communication means, or the time information having been transmitted by the other vehicle, a range of movement of other vehicle from a position based on the position information to another position at a point in time coming after a predetermined time interval has passed; and display means for displaying the relative positional relationship calculated by the processing means, and for displaying the range of movement estimated by the range estimating means for the other vehicle in the positional relationship.

The ninth through twelfth inventions are now described making reference to FIGS. 6, 7, and 16–19.

The manned vehicle displays on the display screen of its display device 52*a* information pertaining to the range of possible locations for another manned vehicle or unmanned vehicle, as depicted in FIGS. 16 and 17, for example. Where the other vehicle is a manned vehicle, and it is further the case that the range of possible locations for the own vehicle and the range of possible locations for the other vehicle interfere, with the other vehicle expected to travel in the same direction over the prearranged travel route for the vehicle, there is issued Warning information to the effect that there is a risk of overtaking the other vehicle (STEP 706 in FIG. 18), whereas if the other vehicle is not traveling in the same direction, there is issued Alarm information warning of the risk of collision with the other vehicle (STEP 707 in FIG. 18).

Substantially identical processes are performed where the other vehicle is an unmanned vehicle (STEP 806, STEP 807 in FIG. 19).

Specific examples of the above-mentioned Warning information would be, for example, a display on the display screen of display device 52*a* to the effect that there is a risk of overtaking the other vehicle, or lighting up of the yellow light of indicator light 52*b*. A combination of the above is also possible. Specific examples of the above-mentioned Alarm information would be, for example, a display on the display screen of display device 52*a* to effect that there is a risk of collision with the other vehicle, for example; lighting up of the red light of indicator light 52*b;* or a buzzer sound emitted by an alarm buzzer 52*c*. Combinations of the above are also possible.

As noted, according to the ninth through eleventh inventions, a manned vehicle is informed of the relative positional relationship of itself and another vehicle, allowing the human operator of the manned vehicle (own vehicle) to ascertain before the fact the likelihood that, on the current course, the vehicles will interfere, for example, so that interference between the vehicles can be avoided.

In particular, visual display of the relative positional relationship of the own vehicle and the other vehicle on a display means affords better recognition of the relative positional relationship.

In the event of impending interference between vehicles, a warning to this effect is provided so that interference between the vehicles can be avoided.

According to the twelfth invention, the relative positional relationship of an own vehicle and other vehicle, as well as the range of movement of the other vehicle with which this positional relationship exists, are displayed by display means, allowing the operator to verify current and future positional relationships vis-á-vis the other vehicle.

BRIEF DESCRIPTION OF THE DRAWINGS

FIG. 16 is a diagram illustrating a range of possible locations for a vehicle (manned vehicle) in a second embodiment;

FIG. 17 is a diagram illustrating a range of possible locations for a vehicle (manned vehicle) in a second embodiment;

DESCRIPTION OF THE PREFERRED EMBODIMENTS

The embodiments of the vehicle interference prevention device pertaining to the invention are described hereinbelow making reference to the accompanying drawings.

Figure 1:
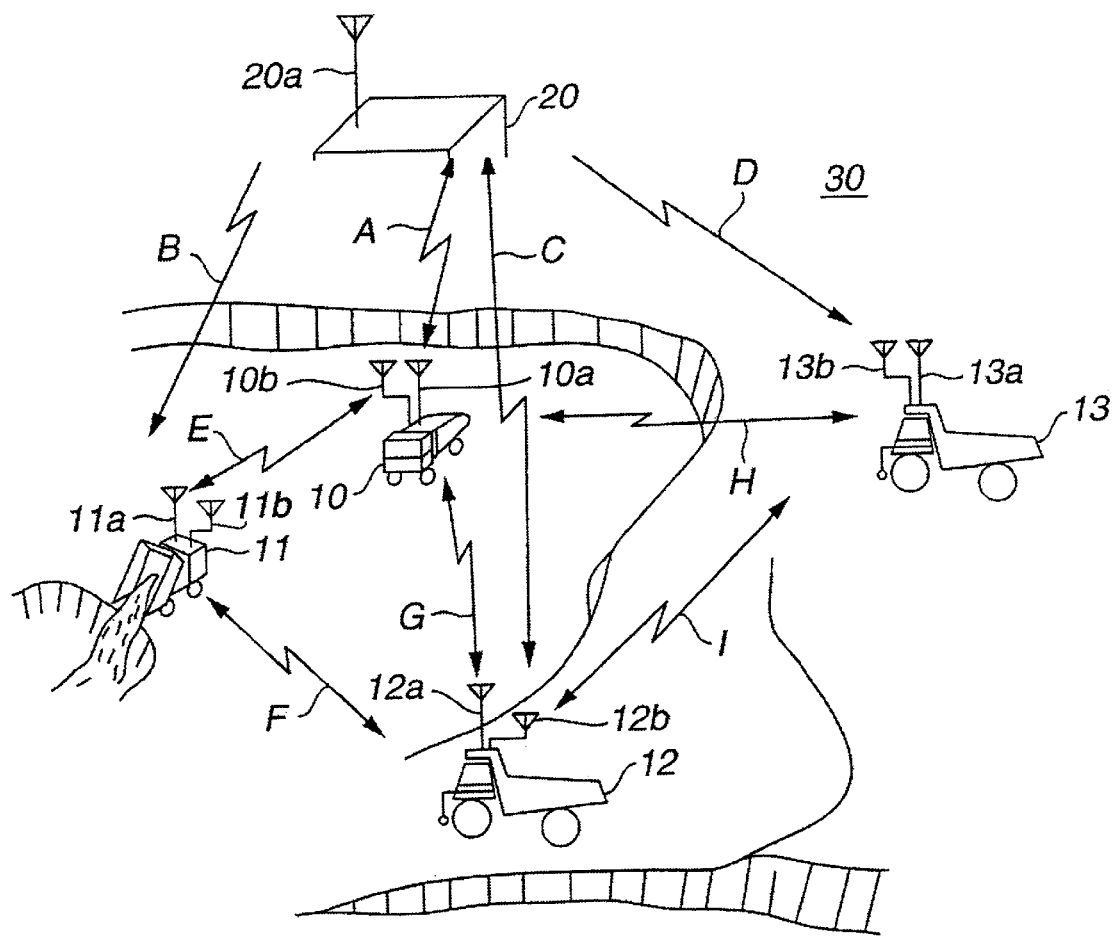
FIG. 1 is a diagram showing the exterior aspect of an entire monitoring vehicle system representing an embodiment of the vehicle interference prevention device which pertains to the invention.

FIG. 1 depicts the exterior aspect of an entire vehicle monitoring system for managing and monitoring a multitude of dump trucks 10, 11, 12, 13 in a large work site 30 such as a mine.

Figure 2:
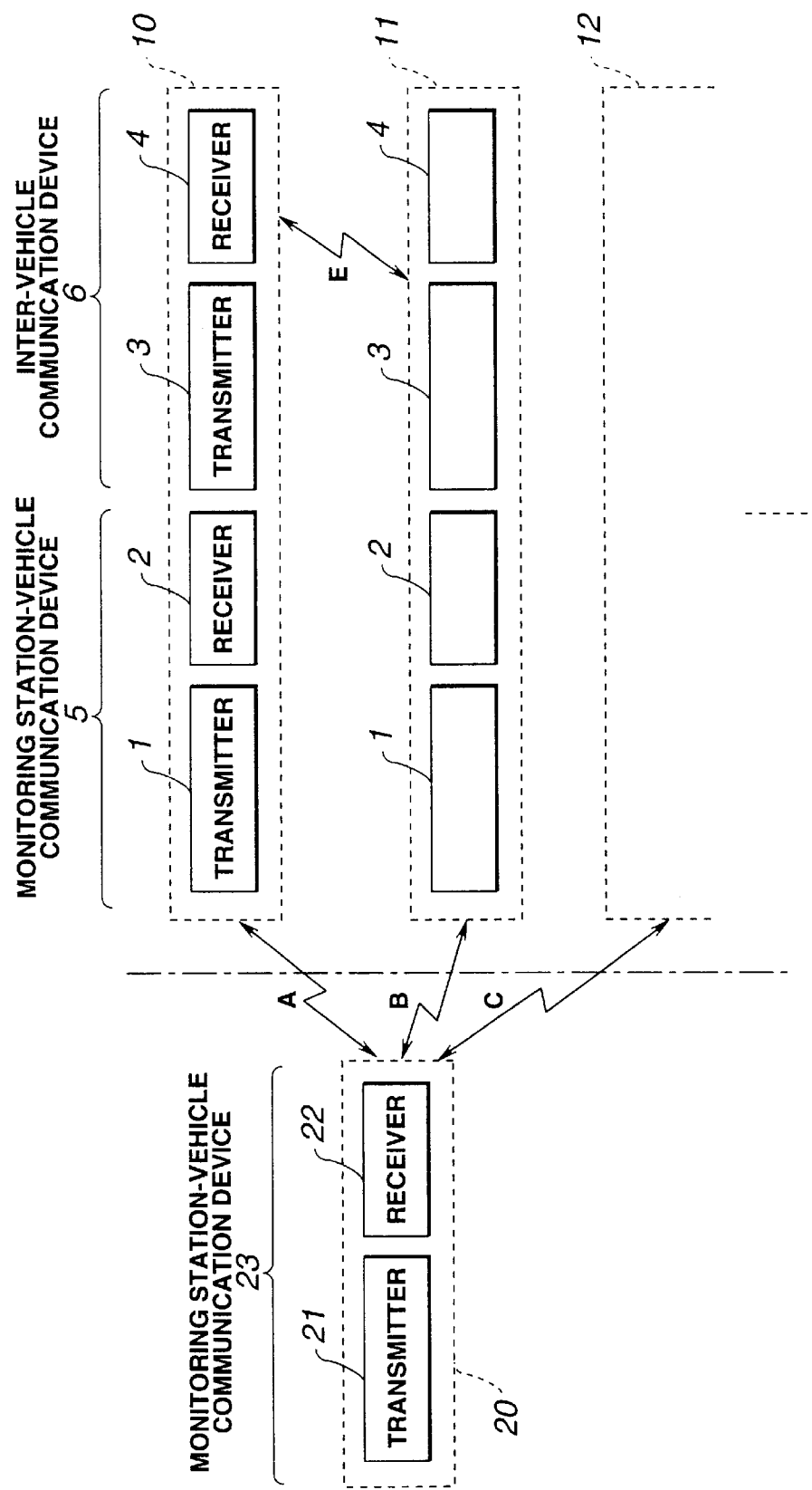
FIG. 2 is a block diagram showing the communication system arrangement in the embodiment.

FIG. 2 is a block diagram showing only the communication system for the vehicle monitoring system.

Referring to FIG. 1, the vehicle monitoring system broadly comprises a plurality of dump trucks (hereinafter termed simply "vehicles") 10, 11, 12, 13, each comprising vehicle position-measuring means, described later, for measuring the position (X, Y) of its own vehicle, and a monitoring station 20 for receiving the position data (X, Y) transmitted by each of the plurality of vehicles, and for using the received position data as the basis for monitoring positional relationships among the plurality of vehicles while transmitting instruction data instructing the plurality of vehicles to move, stop, etc.

The present embodiment presumes that both unmanned vehicles and manned vehicles are present; here, vehicles 10 and 12 are unmanned vehicles, whereas vehicles 11 and 13 are manned vehicles.

While the present embodiment involves dump trucks as the vehicles, implementation with wheel loaders, hydraulic shovels, and the like is also possible, as is implementation in systems in which dump trucks, wheel loaders, hydraulic shovels, and the like are present together.

In the case of hydraulic shovels, for example, interference can be prevented by providing a plurality of GPS and rotation sensors to the rotating boom of a piece of equipment so as to allow for mutual communication of vehicle orientation and status of the equipment.

As shown in FIG. 2, monitoring station 20 and the plurality of vehicles are in wireless communication through monitoring station/vehicle communication devices 23, 5.

Specifically, monitoring station/vehicle communication devices 23, 5 that use a communications format, such as UHF, affording wireless communication over the distances between the monitoring station 20 and the plurality of vehicles, i.e., over the entirety of large work site 30, are provided to the monitoring station 20 and to each of the vehicles 10, . . . , 13 in order that position data and instruction data may be transmitted and received among the monitoring station 20 and the plurality of vehicles.

The monitoring station/vehicle communication device 23 provided to monitoring station 20 comprises a transmitter 21 and a receiver 22, while the monitoring station/vehicle communication device 5 provided to vehicle 10 comprises a transmitter 1 and a receiver 2, with wireless communication A taking place via an antenna 20a of monitoring station 20 and an antenna 10a of vehicle 10, as shown in FIG. 1. For the other vehicles as well, wireless communication B takes place via the antenna 20a of monitoring station 20 and an antenna 11a of vehicle 11, wireless communication C takes place via the antenna 20a of monitoring station 20 and an antenna 12a of vehicle 12, and wireless communication D takes place via the antenna 20a of monitoring station 20 and an antenna 13a of vehicle 13, respectively.

Monitoring station 20 further comprises a GPS (global positioning system) receiver (not shown) for receiving signals transmitted by satellite. Monitoring station 20 computes position measurement error on the basis of accurate data indicating its own position as a reference point and position data from measurements by the GPS receiver, and transmits to each vehicle via transmitter 21 and antenna 20a correction data (differential data) for eliminating the position measurement error.

Control on the basis of communications between the monitoring station/vehicle communication devices does not pertain directly to the gist of the invention and for this reason a detailed discussion is not provided here.

The plurality of vehicles, on the other hand, are in wireless communication through inter-vehicle communication devices 6.

Specifically, inter-vehicle communication devices 6 using a communications format, such as SS (spread spectrum) transmission, that affords wireless communication over the distances among the plurality of vehicles at faster data transmission speeds than the aforementioned monitoring station/vehicle communication devices 23, 5 are provided to each of vehicles 10 to 13, so that data of various kinds, such as the aforementioned position data or control instruction data (described later) can be exchanged among the plurality of vehicles.

The inter-vehicle communication device 6 of each vehicle comprises a transmitter 3 and a receiver 4; as shown in FIG. 1, wireless communication E is carried out via antenna 10$b$ of vehicle 10 and antenna 11$a$ of vehicle 11, wireless communication F is carried out via antenna 11$b$ of vehicle 11 and antenna 12$b$ of vehicle 12, wireless communication G is carried out via antenna 10$b$ of vehicle 10 and antenna 12$b$ of vehicle 12, wireless communication H is carried out via antenna 10$b$ of vehicle 10 and antenna 13$b$ of vehicle 13, and wireless communication I is carried out via antenna 12$b$ of vehicle 12 and antenna 13$b$ of vehicle 13, respectively. Wireless communication occasionally becomes impossible where the distance between vehicles (vehicle 11 and 13, for example) exceeds the distance over which radio waves can travel.

To prevent interference between vehicles, each vehicle periodically broadcasts identification information identifying itself (hereinbelow termed "Vehicle ID") and current position data indicating the current position of itself to all other vehicles and to the monitoring station through UHF transmission, while also periodically broadcasting its own Vehicle ID and current position data to proximate vehicles by SS transmission.

Broadcasting refers to communications requiring no acknowledgment from the receiving wireless station (a vehicle, for example). Since simultaneous communication with all wireless stations without any need for acknowledgement is possible, wireless resources can be used effectively.

When position data for an own vehicle is broadcast to other vehicle, transmitter 3 recognizes, by means of timing means such as a timer, the point in time at which it transmits this position data, and can transmit this transmission time information.

When position data is transmitted (broadcast) to receiver 4 from another vehicle, it can recognize, by means of timing means such as a timer, the point in time at which position data is received, and can store this reception time information.

This transmission time information or reception time information constitutes reference time information needed to estimate, on the basis of the current vehicle position, a position after a predetermined time interval has elapsed. Through a pre-established process it is possible to have the vehicle monitoring system use one or the other of this time information. Specifically, where reception time information is to be used on a system-wide basis, the transmission time information transmit function of transmitter 3 is halted and the reception time information hold function of receiver 4 is used, whereas if transmission time information is to be used, the transmission time information transmit function of transmitter 3 is used and the reception time information hold function of receiver 4 is halted. The present embodiment describes a scenario in which reception time information is used.

The reason for employing UHF transmission for long-distance communications and SS transmission for short-distance communications is that UHF transmission, while having small communications capacity (about 9600 bps), can transmit over long distances (10 km–20 km) and as such can cover the entire mine site (entire large work site) either directly or with the aid of one or two repeaters (relays), whereas SS transmission, while limited to short distances (100 m–1 km) has a large communications capacity (256 Kbps) and is thus suited to frequent exchanges of information among vehicles.

Figure 3:
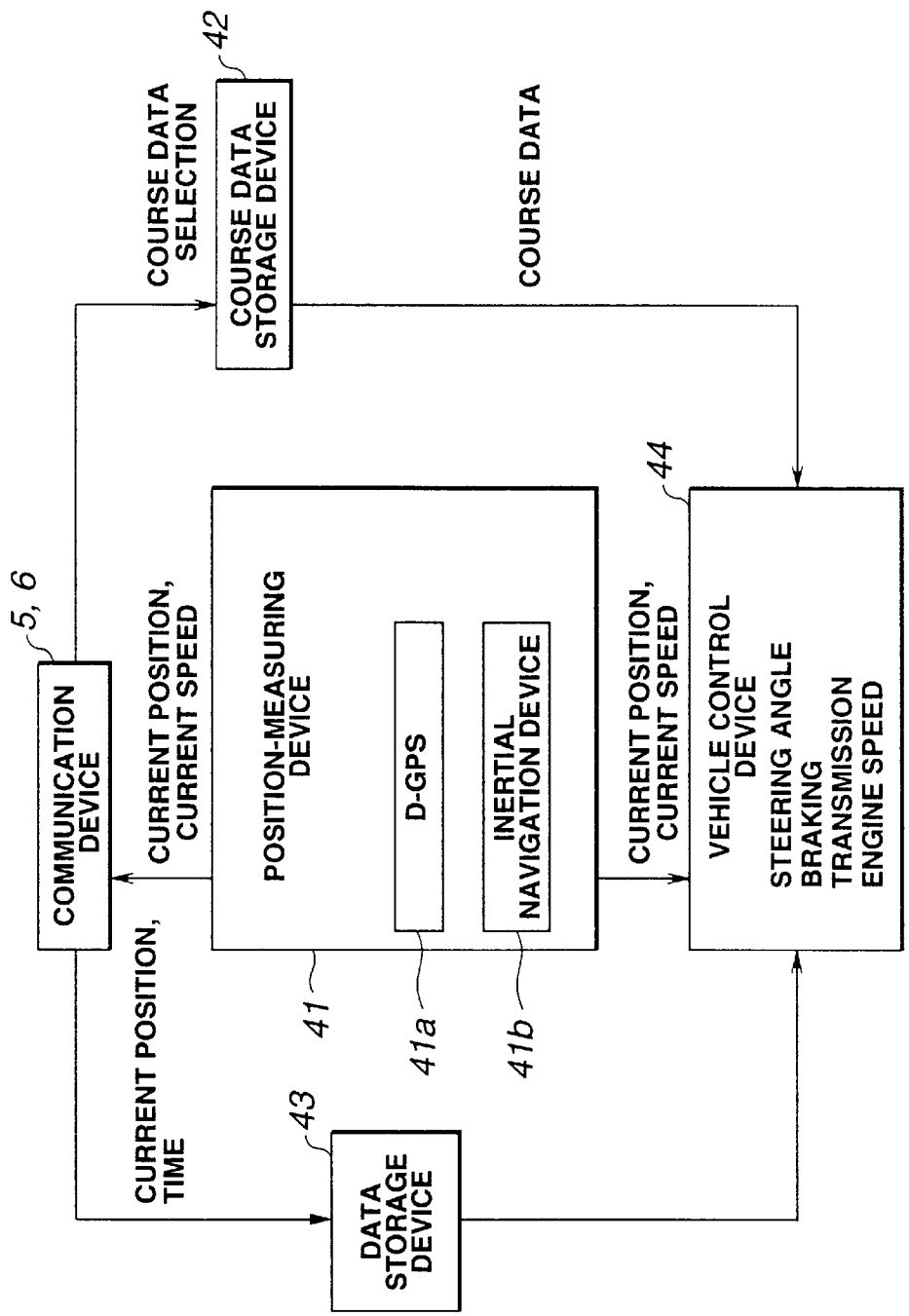
FIG. 3 is a block diagram showing device arrangement on-board an unmanned vehicle.

FIG. 3 is a block diagram showing device arrangement on-board unmanned vehicles (unmanned dump trucks) 10, 12.

Referring to FIG. 3, each unmanned vehicle comprises a position-measuring device 41, built around a CPU (central processing unit), for determining the current position of its own vehicle (vehicle 10, for example); the communication devices 5 and 6 described earlier; a course storage device 42 for storing course data indicating an prearranged travel route, and the like; a data storage device 43 for storing data received via communication device 6; and a vehicle control unit 44 for drive control of its own vehicle 10.

Position-measuring device 41 comprises a D (differential)-GPS (global positioning system) 41$a$ for determining the current position of its own vehicle through signals received from satellites, and an INS (inertial navigation system) 41$b$ for determining the speed of its own vehicle; these measurements are output to the vehicle control unit 44.

In addition to calculating current position, position-measuring device 41 also compares preset course data to actual measured position data to determine direction of progress, accuracy of position measurement, deviation from course (prearranged travel route), and angular deviation from the stipulated direction on the prearranged travel route.

D-GPS 41$a$ calculates an accurate current position by correcting the measured vehicle current position on the basis of differential data transmitted by monitoring station 20.

Course storage device 42 stores data indicating a prearranged travel route, obtained by teaching a prearranged travel route prior to the actual work.

Monitoring station 20 transmits, via transmitter 21 of monitoring station/vehicle communication device 23, instruction data indicating a final target point (destination) for each vehicle to initiate playback operation.

Data storage device 43 stores position data—received via communication device 6—indicating the positions of other vehicles; and time information selected from reception time information for position data of the other vehicle received by its communication device 6, measurement time information indicating the time at which the vehicle position transmitted by the other vehicle was measured, and transmission time information for transmission of position data for the vehicle.

Vehicle control unit 44 controls steering angle, braking, transmission, and engine speed on the basis of data indicating current speed and current position of vehicle 10 measured by position-measurement device 41; instruction data (instructions to halt, decelerate, etc.) received from monitoring station 20 via monitoring station/vehicle communication device 5; and course data stored in course data storage device 42.

Specifically, a target engine speed is set, and the fuel injection rate is controlled in response to an electrical signal applied to an electronic control governor in order to change engine speed. Actual engine speed is sensed by an engine speed sensor, the signal from the sensor serving as a feedback signal for controlling engine speed.

Where the forward/reverse clutch is in forward or reverse (i.e., not in neutral), engine power is transmitted to the tires via a torque converter, transmission, propeller shaft, and differential gear, whereby changes in engine speed produce changes in the travel speed of vehicle 10.

A hydraulic pump is driven by the engine, and the hydraulic fluid from this hydraulic pump is delivered to a hydraulic actuator that actuates a load-carrying platform or the like, and is at the same time delivered via a steering hydraulic electromagnetic proportional valve to a steering cylinder that actuates the steering, whereby steering is actuated in response to an electrical signal presented to the steering hydraulic electromagnetic proportional valve to change the steering angle.

A target value for braking pressure is established, and braking pressure is changed in response to an electrical signal presented to a braking pneumatic electromagnetic proportional valve to operate the brakes. The brakes are provided with brake pressure sensors for sensing brake pressure, the signals from the sensors serving as a feedback signals for controlling braking pressure.

Figure 4:
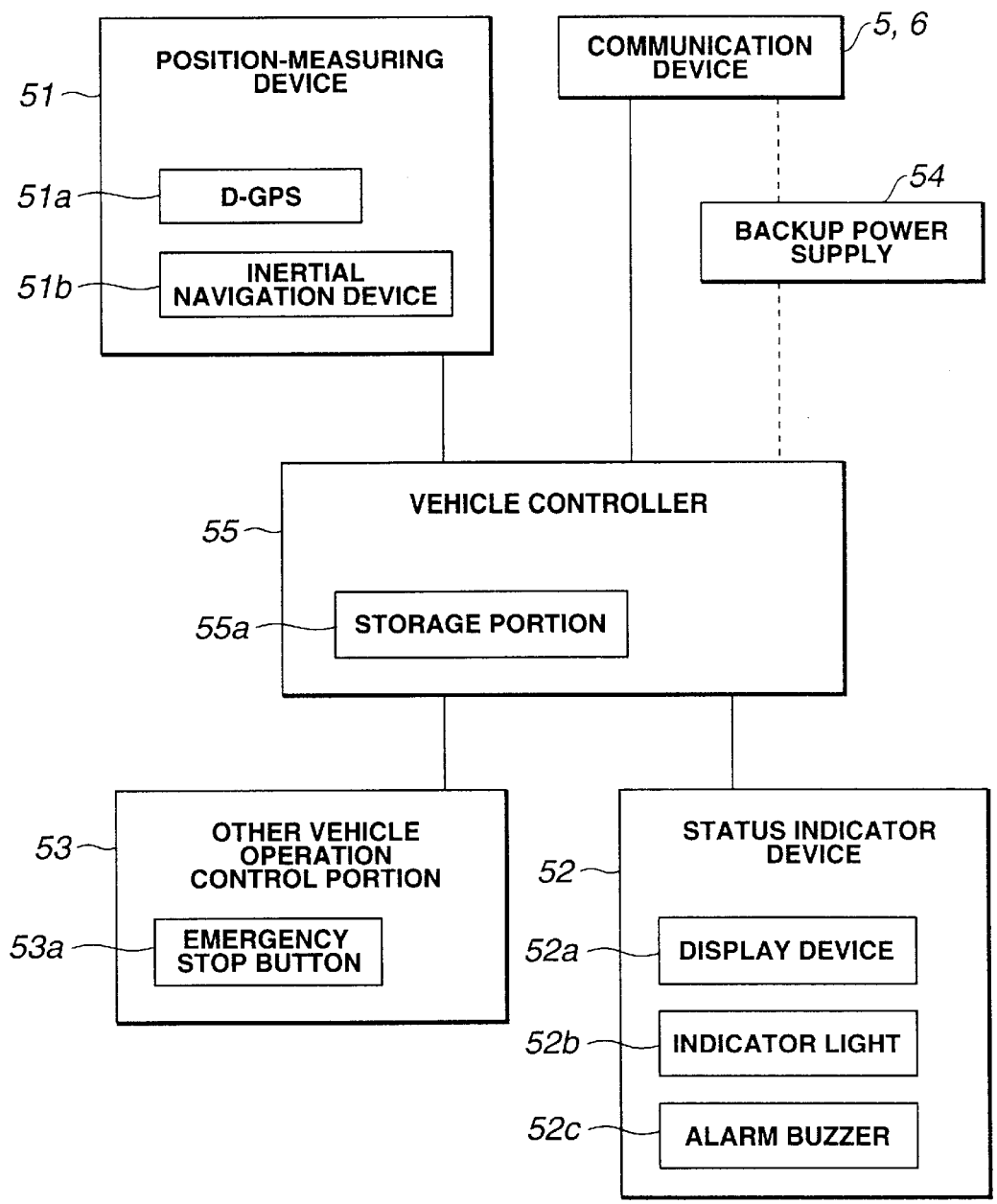
FIG. 4 is a block diagram showing device arrangement on-board a manned vehicle.

FIG. 4 is a block diagram showing device arrangement on-board manned vehicles (manned dump trucks) 11, 13.

Referring to FIG. 4, the manned vehicle (manned vehicle 11, for example) is built around a CPU (central processing unit) and comprises the aforementioned communication devices 5, 6; a position-measurement device 51 analogous in function to position-measurement device 41 described previously; a status indicator device 52; an other vehicle control portion 53 for stopping another unmanned vehicle; a backup power supply 54; and a vehicle controller 55.

Status indicator device 52 comprises a display device 52a for graphical display of the position of its own vehicle and other vehicles on a predetermined travel route (course) in the mine; an indicator light 52b for indicating by three colored indicator lights whether or not travel is permitted; and an alarm buzzer 52c for indicating vehicle malfunction.

Figure 5A:
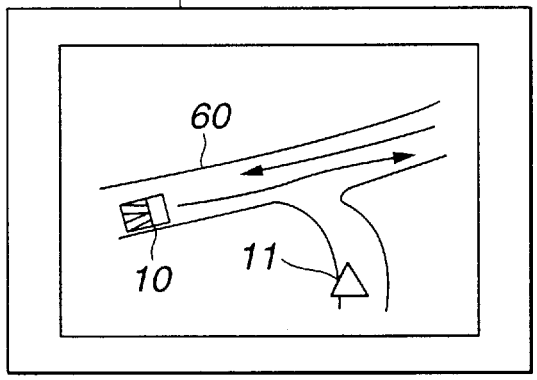
FIGS. 5(a) and 5(b) are diagrams of an exemplary screen display displayed on the display device of a manned vehicle.
Figure 5B:
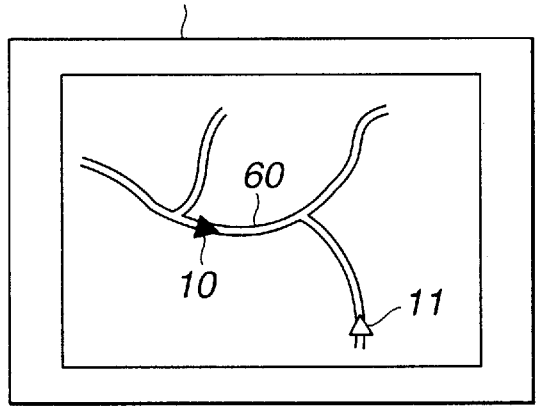

By operating predetermined switches on the console, display device 52a can display an enlarged view (FIG. 5(a)) or a reduced view (FIG. 5(b)) of a prearranged travel route 60 in the mine and the relative positional relationship of the position of the other vehicle (unmanned vehicle 10, for example) and the position of its own vehicle (manned vehicle 11, for example).

Display device 52a also displays vehicle target position and course to be traveled (prearranged travel route) instructions, halt instructions, deceleration instructions, and other instruction data transmitted from monitoring station 20.

Indicator light 52b comprises three indicator lights (lamps), blue, yellow, and red. When lit, the indicator lights indicate the following.

Blue: No other vehicle present ahead of vehicle (travel permitted)

Yellow: Caution: unmanned vehicle nearby

Red: Stop: unmanned vehicle approaching (travel not permitted)

Extinguishing of all three indicator lamps also indicates that travel is not permitted.

Accordingly, the human operator must manually control the vehicle in response to instruction data displayed on display device 52a and the status of indicator lights 52b. Of course, the alarm buzzer 52c indicates a risk of collision with another vehicle and requires that the vehicle be halted quickly.

The emergency stop button 53a of other vehicle control portion 53 is used, by depressing the button 53a in the event of a risk of collision of its own vehicle with another vehicle or the like, to transmit, instruction data for halting the unmanned vehicle to the unmanned vehicle via vehicle controller 55 and communication device 6. Emergency stop button 53a is also used to reset indicator light 52b when all three indicator lights are lit, and to reset alarm buzzer 52c when the buzzer sounds.

Backup power supply 54 provides backup for communication devices 5, 6 and vehicle controller 55 in the event that travel is terminated and power is shut off. This allows notification that power has been shut off and position data indicating the position of the stopped vehicle to be transmitted to monitoring station 20 via monitoring station/vehicle communication device 5 under the control of vehicle controller 55.

While vehicle controller 55 functions analogously to vehicle controlled device 44, steering angle, braking, transmission, and engine speed are basically controlled manually by a human operator, but braking and engine speed are controlled automatically in some instances.

Specifically, the human operator operates the console in accordance with instructions from monitoring station 20 displayed on display device 52a in order to manually control steering angle, braking, transmission, and engine speed.

However, in the event that instructions stipulated in instruction data displayed on display device 52a are not performed by the time a predetermined time interval has passed, braking and engine speed are controlled automatically so that the instruction data is followed automatically in order to decelerate or stop the manned vehicle automatically.

Vehicle controller 55 comprises a storage area 55a for storing data received via communication devices 5, 6. Storage area 55a stores, for example, position data received via inter-vehicle communication device 6 and indicating the positions of other vehicles; and time information selected from reception time information for position data for other vehicle received by its inter-vehicle communication device 6, measurement time information indicating the time at which the vehicle position transmitted by the other vehicle was measured, and transmission time information indicating the time at which the position data for the vehicle was transmitted.

Methods for estimating a range of possible locations for another unmanned vehicle by an unmanned vehicle or a manned vehicle in order to prevent interference among vehicles are now described. Two such methods are as follows.

Method 1: Circle Computation Method

Figure 6:
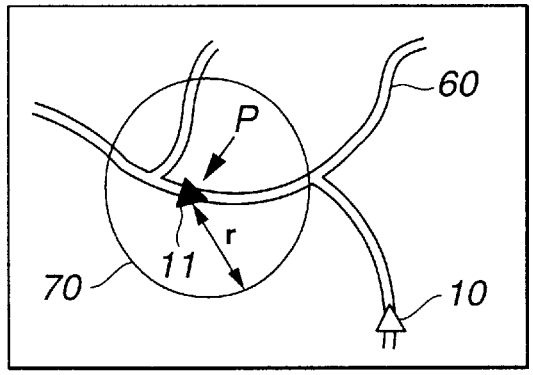
FIG. 6 is a diagram illustrating range of possible locations for a vehicle (manned vehicle)

Referring to FIG. 6, the own vehicle (either an unmanned vehicle or a manned vehicle), for example, unmanned vehicle 10, uses the last position P (position at a certain point in time) based on the position data for a manned vehicle (other vehicle) for example, manned vehicle 11) acquired (received) via inter-vehicle communication device 6 as the basis for computing a circle 70 having position P as its center and having a radius r, this radius being equal to the distance traveled at maximum speed from point P to a predetermined future point in time, and estimates an area within this circle 70 on prearranged travel route 60 as a range of possible locations (a range of movement) for manned vehicle 11.

Method 2: Course Computation Method

Figure 7:
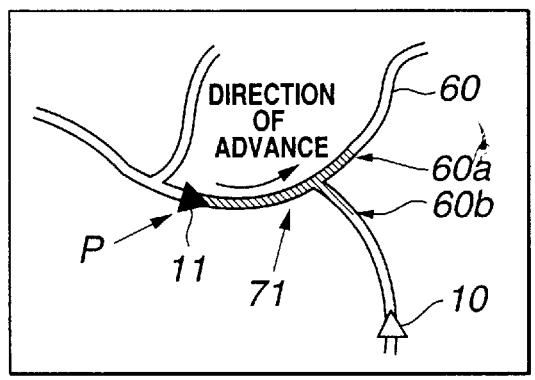
FIG. 7 is a diagram illustrating range of possible locations for a vehicle (manned vehicle)

Referring to FIG. 7, an own vehicle (either an unmanned vehicle or manned vehicle), for example, unmanned vehicle 10, uses the last-acquired position data P (position at a certain point in time) and direction information (direction of progress indicated in the figure by →) for a manned vehicle acquired (received) via inter-vehicle communication device 6 as the basis for computing positions on a prearranged travel route 60 (course), for example, position 60a and position 60b on prearranged travel route 60—assuming movement of the manned vehicle at maximum speed from point P to a predetermined future point in time—and designates the area between point P and positions 60a, 60b (crosshatched area in the future) 71 as the range of possible locations for the manned vehicle.

In the example depicted in FIG. 7, prearranged travel route 60 forks midway, which means that the estimated range over which manned vehicle 11 can travel a given distance from position P is the distance extending to position 60a and the distance extending to position 60b.

A range of possible locations for the manned vehicle can also be estimated using a combination of the two methods. For example, Method 1 can be used for long distances and Method 2 used for shorter distances. Alternatively, rather than plotting a circular range of possible locations using Method 1, one may plot an ellipse having greater extension in the direction of forward advance of the vehicle from the position of the other vehicle. That is, one may plot an ellipse having the direction of forward advance of the vehicle as its major axis.

When using the circle computation of Method 1, there exists a risk that the estimated future range of possible locations for the other vehicle may interfere with the own vehicle if the distance between the two vehicles has been shortened by passing by each other, for example. This may be avoided by employing Method 2; or by employing Method 1 for long distances, while for shorter distances transmitting to the other vehicle, by means of SS transmission, direction of advance information and predicted route information in addition to position information, so as to provide a more precise estimate of range of possible locations.

The preceding discussion relates to computing a range of possible locations for a manned vehicle, but these same methods may be utilized in computing a range of possible locations for an unmanned vehicle.

According to the present embodiment, data can be exchanged as follows between vehicles situated in close proximity to each other such that SS transmission is possible.

An unmanned vehicle transmits to another vehicle position data indicating its current vehicle position and position data at a plurality of points on a predetermined travel course. At the same time, data indicating the current position measurement accuracy and data indicating positional deviation are transmitted to other vehicles.

A manned vehicle, meanwhile, transmits to another vehicle position data indicating its current vehicle position and information concerning the direction of advance. At the same time, data indicating the current position measurement accuracy, data indicating positional deviation from the course, and data indicating angular deviation from an indicated direction on the course are transmitted to other vehicles.

At this time, in the event that positional deviation and angular deviation of the manned vehicle should exceed stipulated values, the unmanned vehicle will halt the own vehicle and transmit an alarm signal to this other vehicle (manned vehicle).

Between vehicles that are close enough together that communication via SS transmission is possible, the range of possible locations of the other vehicle or own vehicle is estimated as follows.

For an unmanned vehicle, the range of possible locations is estimated as a path connecting a plurality of points on a prearranged travel route, of width including latitude for position measurement accuracy, positional deviation, and vehicle width.

For a manned vehicle, on the other hand, the range of possible locations is estimated as a circle centered on the current position, of diameter including latitude for position measurement accuracy and vehicle width.

Broadly speaking, this vehicle monitoring system can take either of two patterns, one in which the own vehicle is an unmanned vehicle, and the other vehicle is either a manned vehicle or unmanned vehicle, with data being exchanged between these vehicles; and one in which the own vehicle is a manned vehicle, and the other vehicle is either a manned vehicle or unmanned vehicle, with data being exchanged between these vehicles.

The present embodiment assumes the first pattern (namely, that the own vehicle is an unmanned vehicle and the other vehicle is either a manned vehicle or unmanned vehicle). A description of the specifics of the process for preventing interference between vehicles follows.

Figure 8:
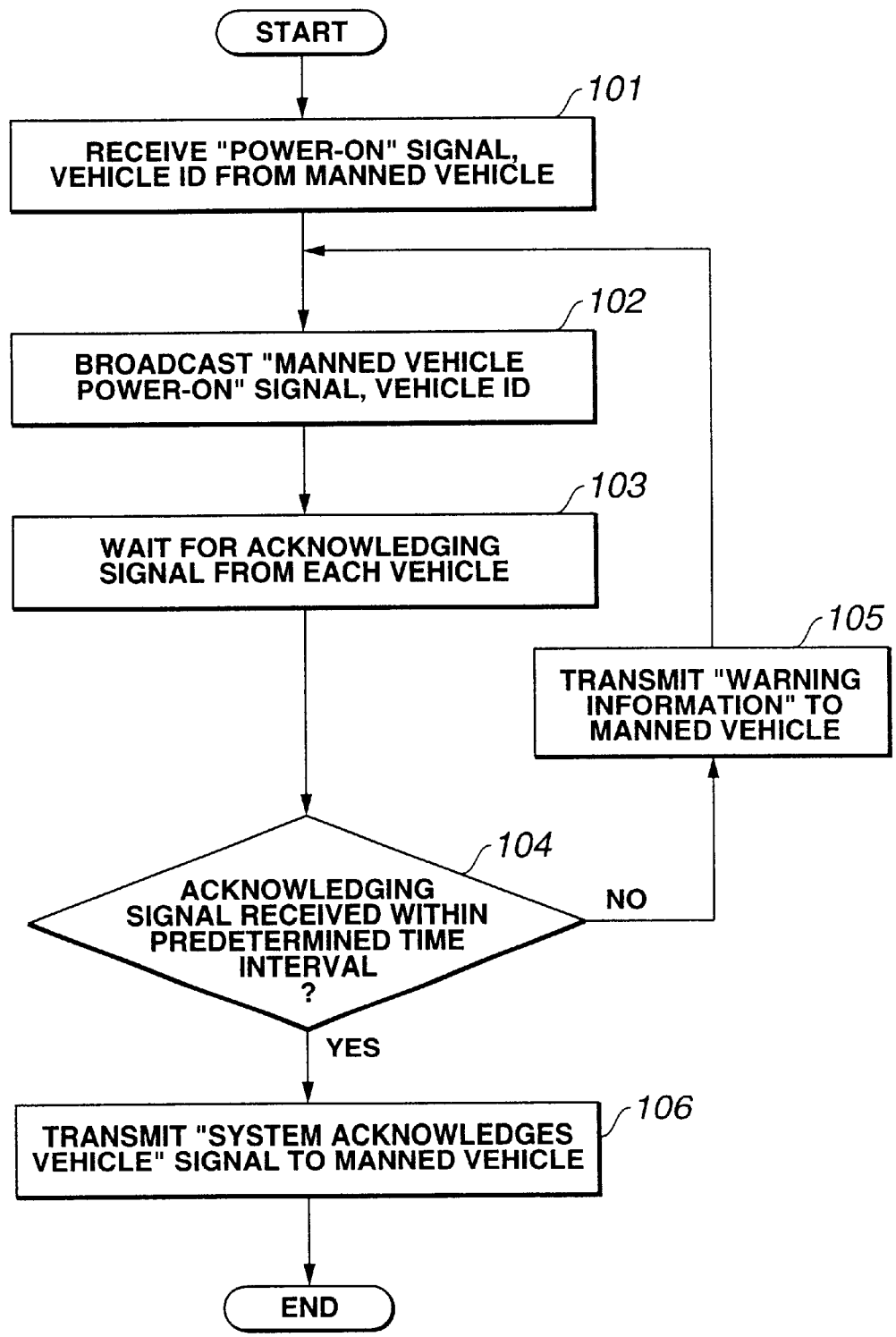
FIG. 8 is a flow chart of a process operation by a monitoring station during power-on of a manned vehicle.

Processing by monitoring station 20 during power-on (turning on the power supply) of the manned vehicle in a vehicle monitoring system of this design is now described making reference to the flow chart of FIG. 8.

Referring to FIG. 8, upon receiving via monitoring station/vehicle communication device 23 a signal from the manned vehicle to the effect that "power has been turned on" and the Vehicle ID (STEP 101), monitoring station 20 broadcasts via monitoring station/vehicle communication device 23 a signal to the effect that "the manned vehicle power has been turned on" and the vehicle ID of the manned vehicle (STEP 102), while awaiting an acknowledging signal (ACK) from each vehicle (STEP 103), and determines if acknowledging signals have been received within a predetermined time interval from all vehicles operating at that time (STEP 104).

If acknowledging signals are not received from all vehicles in STEP 104, monitoring station 20 determines that some vehicles are unaware that the manned vehicle has been powered up, and issues Warning information to this effect, which is transmitted to the powered-up manned vehicle via monitoring station/vehicle communication device 23 (STEP 105), and then proceeds to STEP 102; on the other hand, if acknowledging signals are received from all vehicles, it transmits to the powered-up manned vehicle a signal to the effect that "the system acknowledges the manned vehicle" via monitoring station/vehicle communication device 23 (STEP 106).

The manned vehicle, having received via monitoring station/vehicle communication device 5 a signal to the effect that "the system acknowledges the manned vehicle," can now be driven under control of the human operator.

Figure 9:
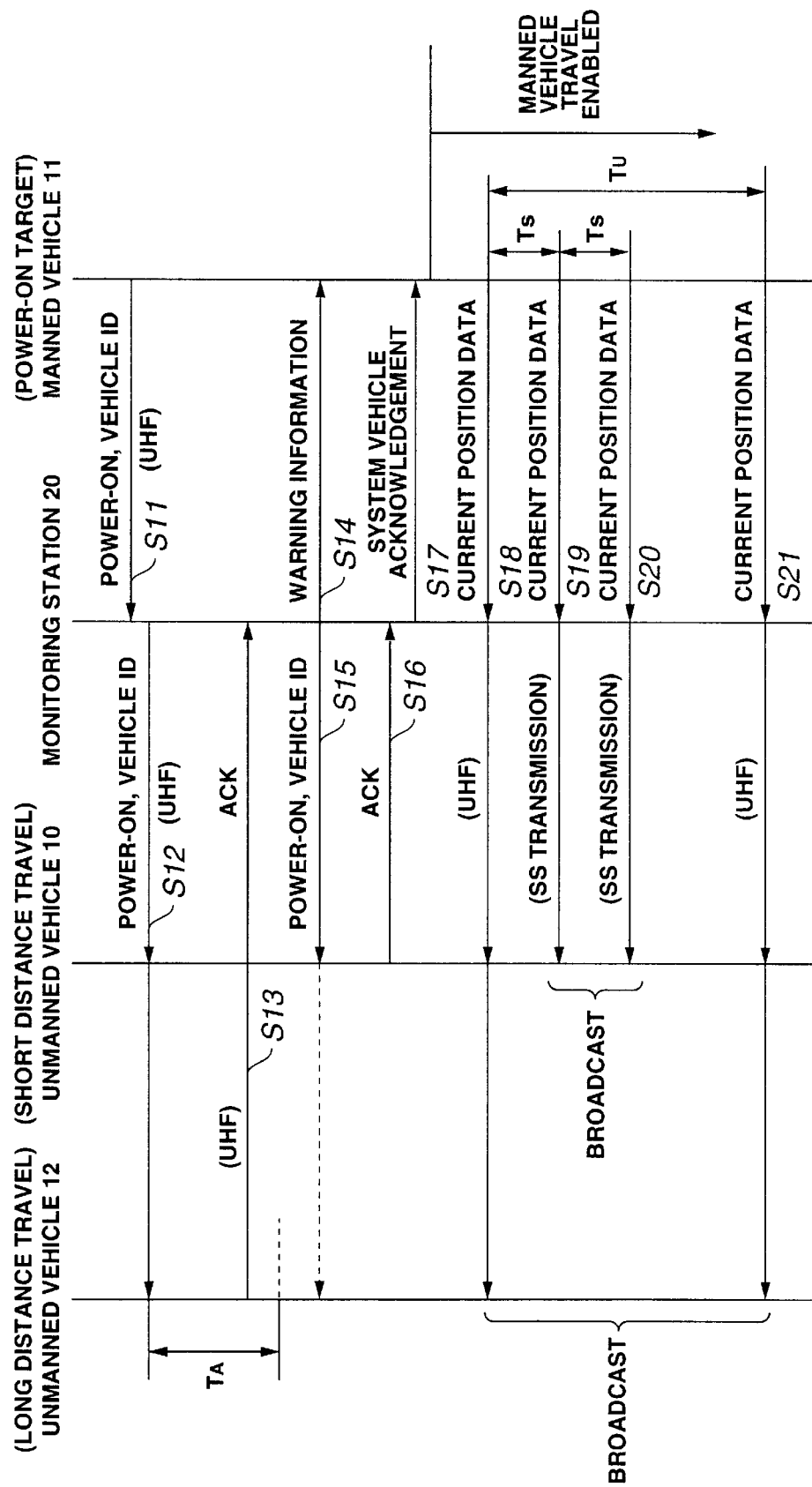
FIG. 9 is a sequence diagram showing a process operation by a vehicle monitoring system during power-on of a manned vehicle.

The preceding process is now described in detail making reference to FIG. 9. FIG. 9 is a sequence diagram showing exchange of data among the monitoring station, vehicles in operation, and the manned vehicle being powered up.

Here, it is assumed that, in FIG. 1, the manned vehicle 11 is powered up, an unmanned vehicle 10 is an operation at a distance from the manned vehicle 11 such that communication with the manned vehicle 11 by SAS transmission is possible, an unmanned vehicle 12 is an operation at a distance from the manned vehicle 11 such that communication with the manned vehicle by UHF transmission is possible, and monitoring station 20 exchanges data with the manned vehicle 11, the unmanned vehicle 10 and the unmanned vehicle 12.

At power-on, the vehicle controller 55 of manned vehicle 11 enters malfunction detection mode, at which time a Power-on signal and Vehicle ID for manned vehicle 11 are transmitted to monitoring station 20 through UHF transmission via communication device 5 (S11).

Through UHF transmission via a monitoring station/vehicle communication device 23, monitoring station 20 transmits to all vehicles currently in operation (unmanned vehicles 10 and 12 in this example) the Vehicle ID for the newly powered-up manned vehicle 11 and a signal indicating that "manned vehicle 11 has powered up" (S12), and awaits an acknowledging signal (ACK) from each vehicle. Let it be assumed here by way of example that an acknowledging signal has been received from unmanned vehicle 12 (S13) whereas no acknowledging signal has been received from unmanned vehicle 10 even after a predetermined time interval TA has passed; in this event, Warning information is transmitted to manned vehicle 11 (S14), and the same signal (namely, the same signal as in S12) is re-transmitted to both unmanned vehicles 10 and 12 or to unmanned vehicle 10 which has failed to respond (S15).

Where unmanned vehicle 10 responds with an acknowledging signal (S16) so that acknowledging signals have been input from all vehicles, monitoring station 20 transmits to manned vehicle 11 a signal to the effect that "the system acknowledges the manned vehicle."

If, after transmitting the signal, no answer is received despite passage of an additional predetermined time interval, monitoring station 20 issues an Abnormal Status message to manned vehicle 11.

Upon receiving an Abnormal Status message, manned vehicle 11 recognizes that the communication devices 5, 6 of some or all of the other vehicles in operation (traveling) are malfunctioning, and goes into standby at its current vehicle position.

Specifically, if, during power-on, manned vehicle 11 fails to receive via monitoring station/vehicle communication device 5 a response from monitoring station 20 (that is, from another vehicle currently in operation (for example, unmanned vehicle 10 or 12 or manned vehicle 13)) to notification of its own vehicle ID and notification that it has powered up, manned vehicle 11 recognizes that the communication devices 5, 6 of the other vehicle are malfunctioning and goes into standby at its current vehicle position.

Where manned vehicle 11 has received a signal indicating that "the system acknowledges the manned vehicle," it recognizes that the communication devices 5, 6 of the other vehicles are functioning normally.

The vehicle controller 55 of the manned vehicle 11—having received a signal indicating that the system acknowledges the manned vehicle—will, if no other abnormal states are detected, light all of the indicator lights of indicator light 52b for a 10-second period, and sound the buzzer of alarm buzzer 52c. The human operator (driver) must depress (depress a first time, for example) emergency stop button 53a in order to turn off the indicator light lamps and the buzzer, and must then again depress emergency stop button 53a (depress a second time, for example) in order to exit malfunction detection mode.

If vehicle controller 55 does not detect depression of emergency stop button 53a after a predetermined time interval has elapsed, after 10 seconds it displays a message to this effect on display device 52a and lights up the red light of indicator light 52b to notify the driver that operation has been disabled. Malfunction of emergency stop button 52c will result in disabled operation. Alternatively, in such a situation the driver, having been notified of a malfunction by indicator light 52b and the alarm buzzer, must stop operation of the vehicle.

Once operation has been enabled by twice depressing emergency stop button 53a to exit malfunction detection mode, manned vehicle 11—which is now enabled for travel—broadcasts current vehicle position data (the initial current position is the position at which it is stopped) and vehicle ID for manned vehicle 11 at periodic intervals TU (once about every 15 seconds, for example) by UHF transmission via inter-vehicle communication device 6 to the unmanned vehicles (all vehicles) 10, 12, as well as broadcasting this current vehicle position information and vehicle ID to monitoring station 20 via monitoring station/vehicle communication device 6 (S18, S21). It also broadcasts current vehicle position information and vehicle ID at periodic intervals TS (one about every 0.5 seconds, for example) by SS transmission via inter-vehicle communication device 6 to a proximate vehicle 10 (S19, S20).

In the example depicted in FIG. 9, for simplicity of description, the sequence chart shows broadcasting current position information by manned vehicle 11 only, but in actual practice unmanned vehicles 10 and 12, like manned vehicle 11, will also broadcast current position data. That is, all traveling vehicles broadcast their current position data to other vehicles or to monitoring station 20. While it is assumed here that all traveling vehicles are unmanned vehicles, they could just as easily be all manned vehicles, or a combination of manned vehicles and unmanned vehicles.

Figure 10:
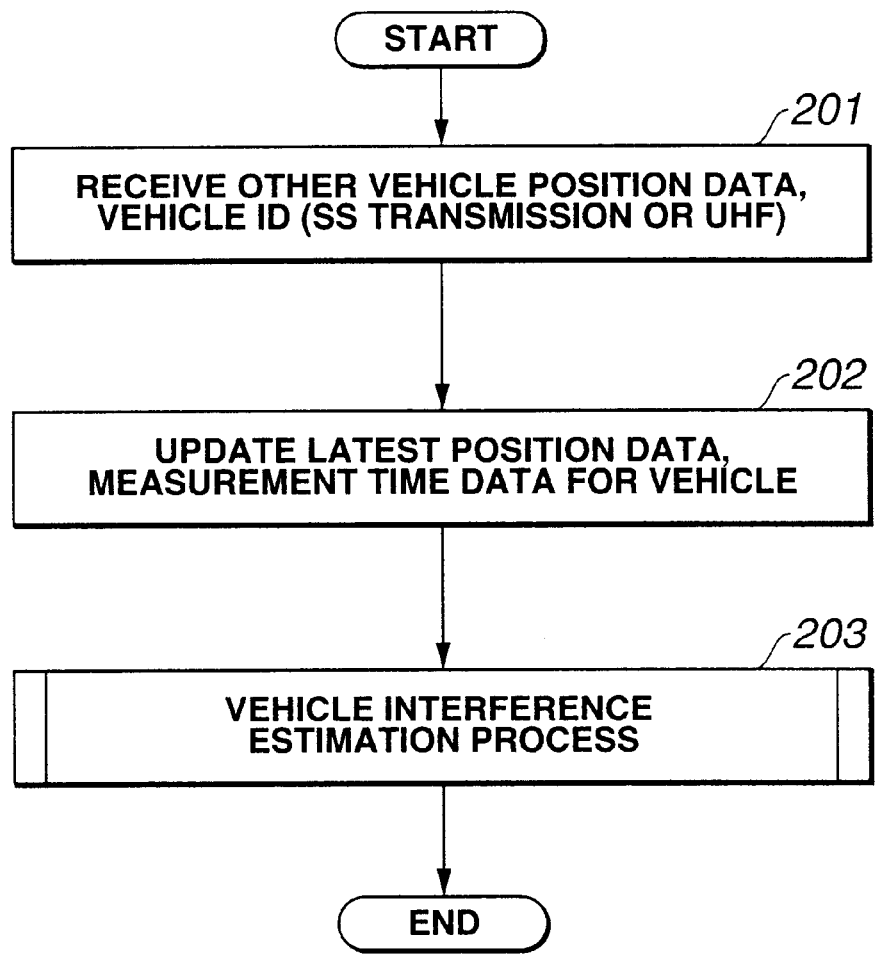
FIG. 10 is a flow chart showing a process operation by an unmanned vehicle.

Unmanned vehicle operation is now described making reference to FIG. 10.

Referring to FIG. 10, an unmanned vehicle receives via inter-vehicle communication device 6 vehicle position data and a Vehicle ID transmitted to it from another vehicle (manned vehicle or unmanned vehicle) by SS transmission or UFI transmission (STEP 201), and after updating the position data (most recent position data) and measurement time information for the other vehicle identified by this Vehicle ID (STEP 202), it executes a vehicle interference prevention process (STEP 203).

The vehicle interference prevention process may be carried out by either of two processes, described below.

Figure 11:
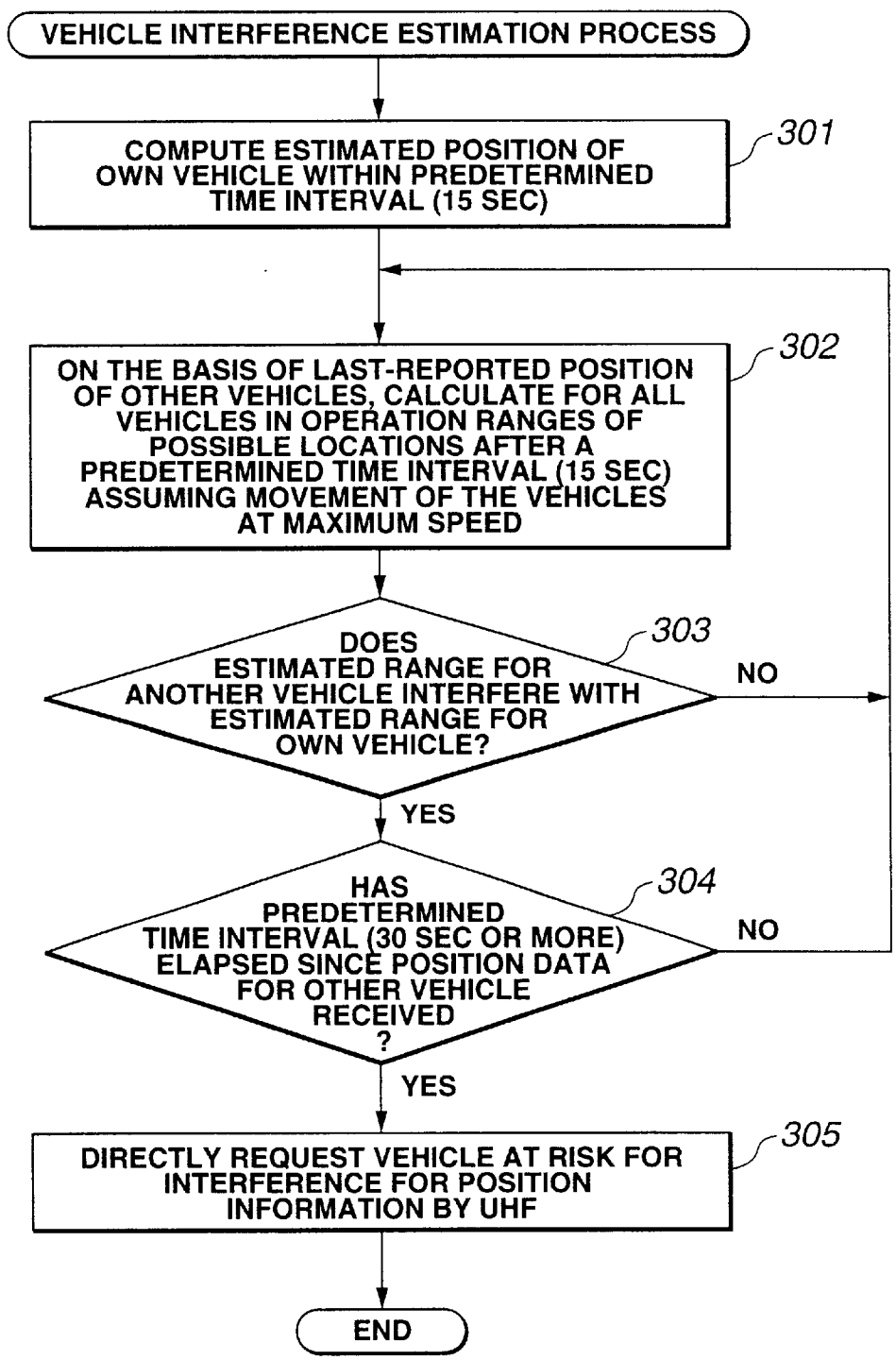
FIG. 11 is a flow chart showing an interference estimation process operation by a vehicle.

First, the unmanned vehicle repeats the following process at given time intervals (100 msec, for example), as depicted in FIG. 11.

Specifically, on the basis of its current position, the unmanned vehicle calculates an estimated vehicle position for itself within a given time interval (15 seconds, for example) (STEP 301), and for all other vehicles currently in operation (manned vehicles or unmanned vehicles) calculates for each, on the basis of the position represented in the last-reported current position information from the other vehicle, a range of possible locations after a given time interval (15 seconds, for example) assuming movement of the vehicle at maximum speed (STEP 302).

Next, a decision is made as to whether the range of possible locations (ranges of movement) for another vehicles will interfere with the range of possible locations (range of movement) for the own vehicle (STEP 303); where there is no interference, it proceeds to STEP 302.

Where interference appears in STEP 303, the unmanned vehicle makes a decision as to whether the point in time at which it calculated the range of possible locations postdates, in excess of a predetermined time interval (30 seconds or more, for example), the point in time at which position data for the other vehicle was received (STEP 304). If this predetermined time interval has not been exceeded, it proceeds to STEP 302, whereas if this predetermined time interval has been exceeded, it makes a direct request for position data to the vehicle at risk for interference (STEP 305) by UHF transmission via inter-vehicle communication device 6.

Vehicles at risk for interference are identified as follows. Since position data and vehicle IDs are broadcast from the other vehicles, where the point in time at which a range of possible locations is calculated on the basis of position data exceeds this predetermined time interval, the vehicle ID paired with this position data can be referenced to identify the vehicle. A request for position information is made to the vehicle identified by this vehicle ID.

Figure 12:
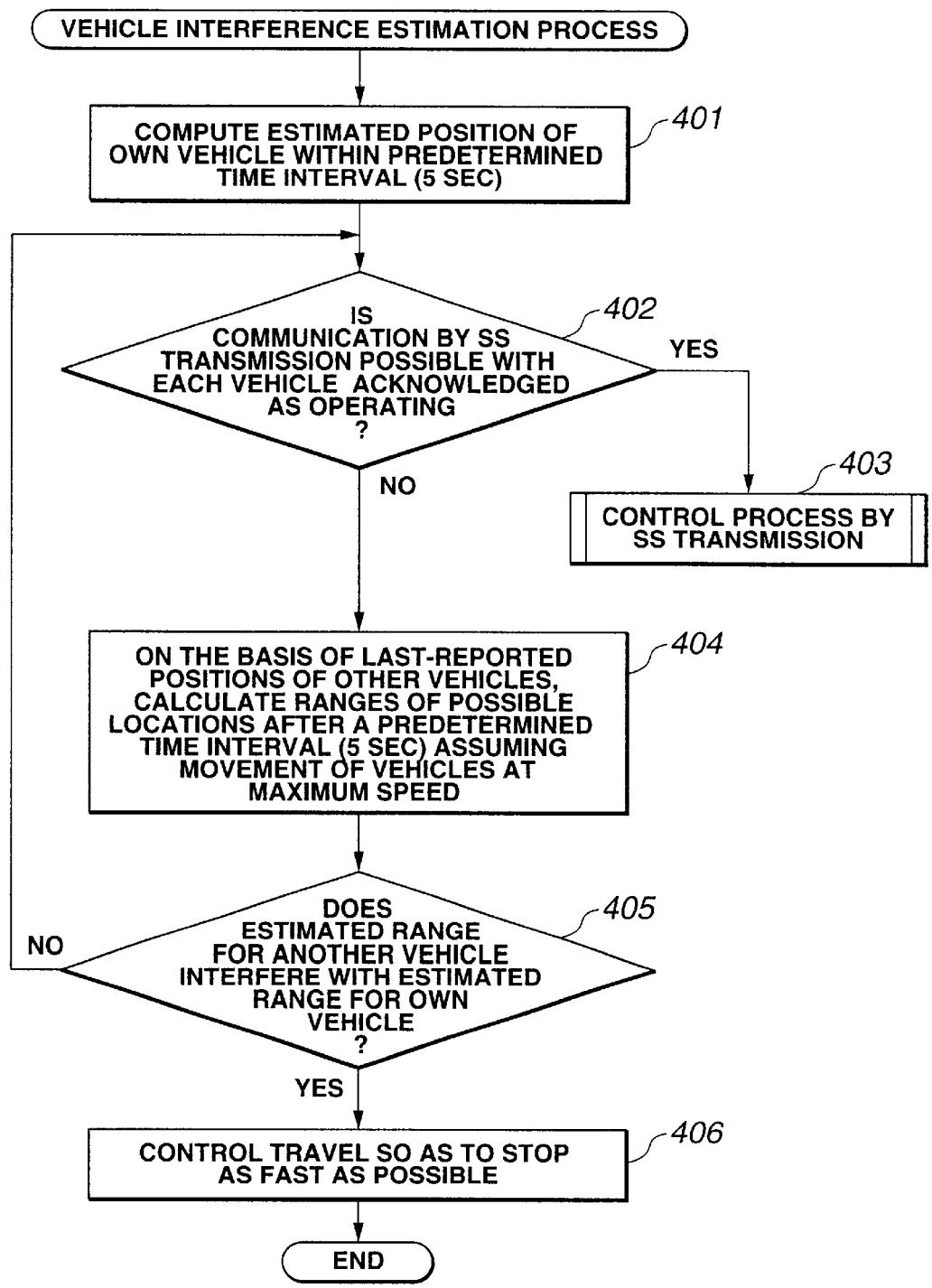
FIG. 12 is a flow chart showing an interference estimation process operation by a vehicle.

Next, the unmanned vehicle repeats the following process at given time intervals (100 msec, for example), as depicted in FIG. 12.

On the basis of its current position, the unmanned vehicle calculates an estimated vehicle position for itself within a given time interval (5 seconds, for example) (STEP 401), and for all other vehicles recognized as being currently in operation (manned vehicles or unmanned vehicles) decides whether communication with each by SS transmission is possible (STEP 402).

Where SS transmission is determined to be possible, a control process by SS transmission is initiated (STEP 403), whereas if SS transmission is determined to be impossible, a range of possible locations after a given time interval (5 seconds, for example)—assuming movement of each vehicle at maximum speed—is computed on the basis of the position represented in the last-reported current position information from the other vehicle (STEP 404).

Next, a decision is made as to whether the range of possible locations (ranges of movement) for another vehicles interferes with the range of possible locations (range of movement) for the own vehicle (STEP 405); where there is no interference, it proceeds to STEP 402, whereas if interference appears, the own vehicle (unmanned vehicle) performs travel control by means of vehicle control device 44 so as to stop at the maximum speed (STEP 406).

Figure 13A:
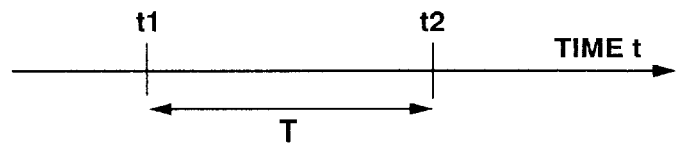
FIGS. 13(a) to 13(c) are diagrams illustrating a range of possible locations for a vehicle.
Figure 13B:
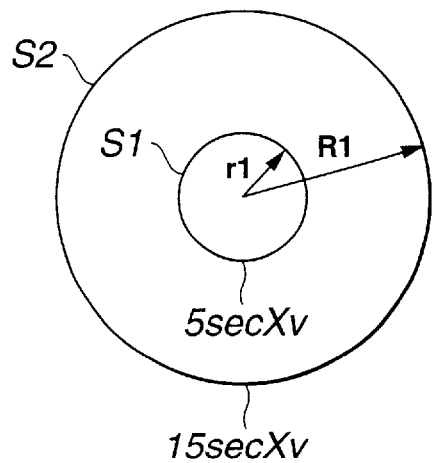
Figure 13C:
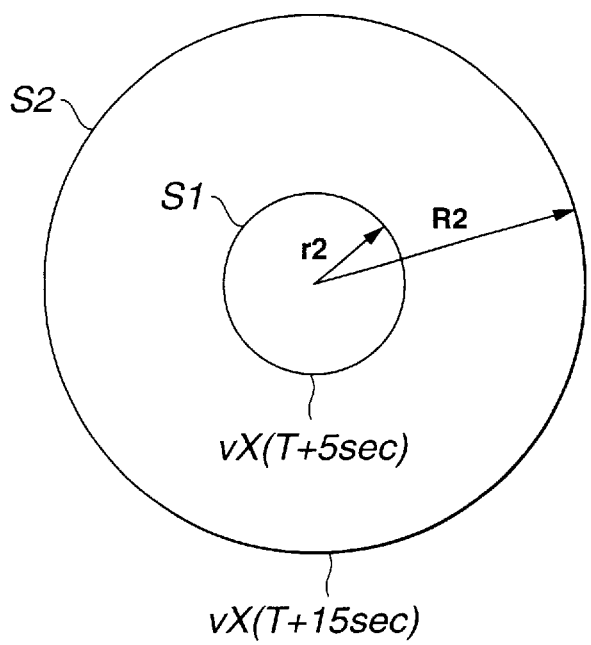

The particulars discussed in FIGS. 11 and 12 are described in greater detail making reference to FIGS. 13(a) to 13(c).

Referring to FIG. 13(a), when position data for another vehicle is received by the own vehicle at time t1, this own vehicle calculates at 100 msec intervals circles having as their radii the distances over which the own vehicle and the other vehicle can travel over predetermined time intervals, namely, 5 seconds and 15 seconds, as shown in FIG. 13(b).

Specifically, the range of possible locations at time t1 for the other vehicle 5 seconds in the future is calculated as a circle S1 having a radius r1 equal to 5 sec.×maximum speed v, and that for 15 seconds in the future is calculated as a circle S2 having a radius R1 equal to 15 sec.×maximum speed v. Circular ranges of possible locations for the own vehicle are calculated in the same manner on the basis of current traveling speed.

During the interval from time t1—at which the current position data was reported—to the next position data report coming 15 seconds later, a range of possible locations at time t2, coming after a time interval T—which is a positive integer multiple of 100 msec—is calculated in the following manner. Referring to FIG. 13(c), for 5 seconds in the future, a circle S1 having a radius r2 equal to (5 sec.+T)×maximum speed v (the circle having as its center the position at time t1) is calculated, and for 15 seconds in the future, a circle S2 having a radius R2 equal to (15 sec.+T)×maximum speed v (the circle having as its center the position at time t1) is calculated in the same manner.

As regards range of possible locations for the own vehicle, since vehicle position is constantly measured by the position-measuring device 51 of the vehicle, its position at time t2 is known, whereby a circle having as its basis (the center of the circle) the position at time t2 can be calculated on the basis of current travel speed, as shown in FIG. 13(b).

When position data for the other vehicle is reported 15 seconds later, a range of possible locations for the other vehicle is calculated as a circle having as its center this position, as shown in FIG. 13(b). The above process is subsequently repeated.

In the event that, owing to a malfunction of the inter-vehicle communication device 6 of the other vehicle or the like, position data cannot be received from the other vehicle, time interval T assumes a large value at, for example, (5 sec.+T)×maximum speed v=r2 at 5 seconds in the future, so the range of possible locations for the other vehicle increases in area (the circle becomes larger), as shown in FIG. 13(c). Thus, the range of possible locations for the other vehicle and the range of possible locations for the own vehicle will interfere, so the process of STEP 305 of FIG. 11 or of STEP 406 of FIG. 12 is performed. As a result, control is performed so as to prevent interference.

Next, the process of aforementioned STEP 403, namely, unmanned vehicle control by SS transmission, is described. Here, the other vehicle may be either a manned vehicle or an unmanned vehicle; the case of a manned vehicle is described first, followed by a description of the case of an unmanned vehicle.

Other Vehicle=Manned Vehicle

Figure 14:
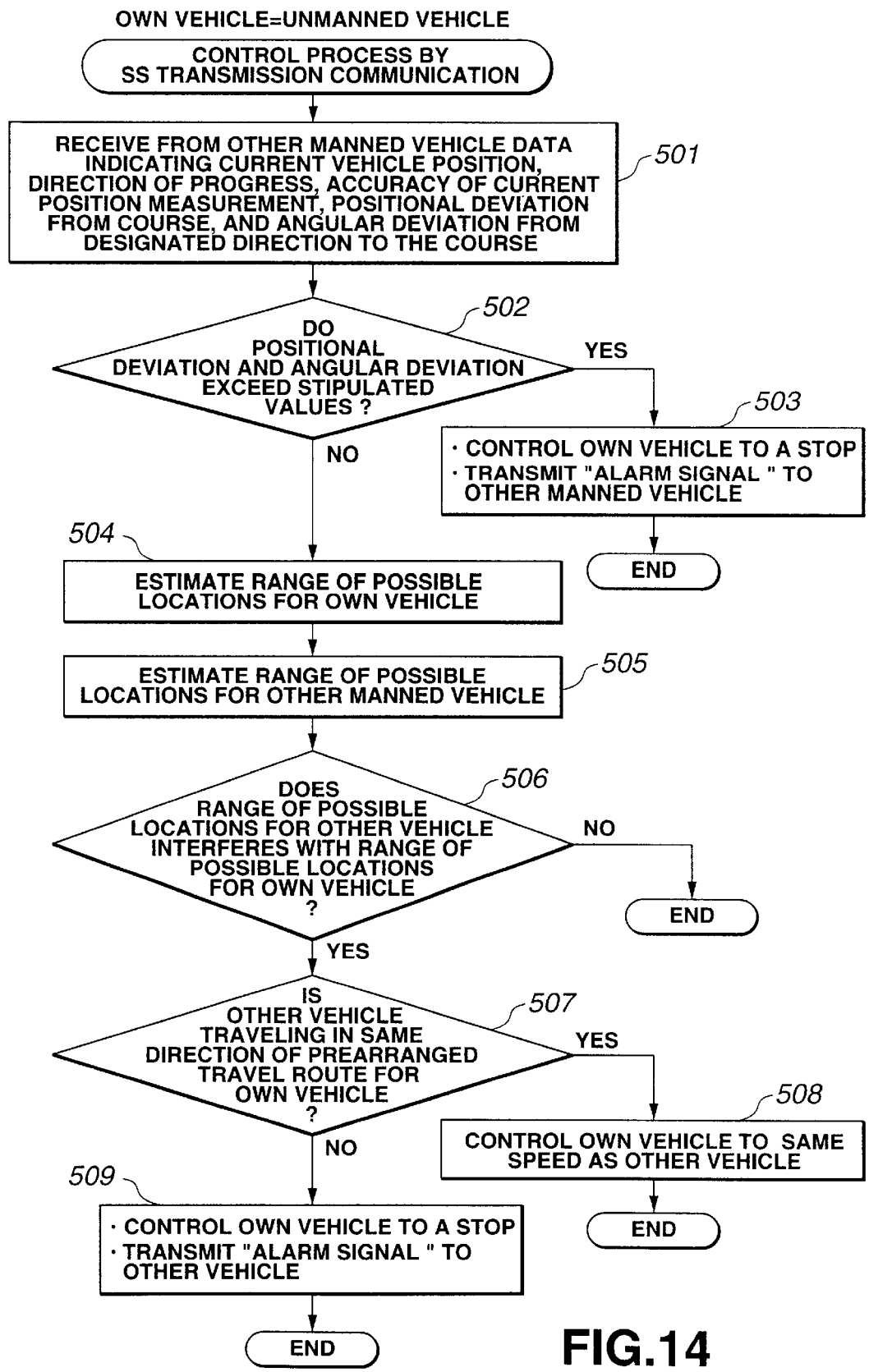
FIG. 14 is a flow chart showing a process operation by SS transmission.

Referring to FIG. 14, an own vehicle (unmanned vehicle) receives from another vehicle (manned vehicle) data indicating current vehicle position, direction of progress, accuracy of current position measurement, deviation from course, and angular deviation from the stipulated direction on the course (STEP 501), and determines whether positional deviation and angular deviation exceed stipulated values (STEP 502).

In the event that these stipulated values have been exceeded, the own vehicle is controlled to a stop by means of its vehicle control device 44, and an Alarm signal is transmitted to the other vehicle via inter-vehicle communication device 6 (STEP 503). Where the stipulated values have not been exceeded, the own vehicle estimates a range of possible locations for itself (STEP 504) and also estimates a range of possible locations for the other vehicle (STEP 505).

Specifically, for the own vehicle, the range of possible locations is estimated as a path connecting a plurality of points on prearranged travel route, of width including latitude for position measurement accuracy, positional deviation, and vehicle width, whereas for the other manned vehicle, the range of possible locations is estimated as a circle centered on the current position, of diameter including latitude for position measurement accuracy and vehicle width.

Once ranges of possible location for the vehicles have been computed in this way, a decision is made as to whether the range of possible locations for the other vehicle interferes with the range of possible locations for the own vehicle (STEP 506), and in the event that these ranges interfere with each other, data indicating the direction of advance of the other vehicle is used as the basis for a decision as to whether the other vehicle is traveling in the same direction on the predetermined travel route for the own vehicle (STEP 507).

In STEP 507, where the other vehicle is traveling in the same direction, there exists the risk that the own vehicle will overtake the other vehicle, so the speed of the own vehicle is controlled to the same speed as the other vehicle by vehicle control device 44 (STEP 508). Where the other vehicle is not traveling in the same direction, there exists the risk of collision between the other vehicle and the own vehicle, so the own vehicle is controlled to a halt by vehicle control device 44 and an Alarm signal is transmitted to the other vehicle via inter-vehicle communication device 6 (STEP 509).

Other Vehicle=Unmanned Vehicle

Figure 15:
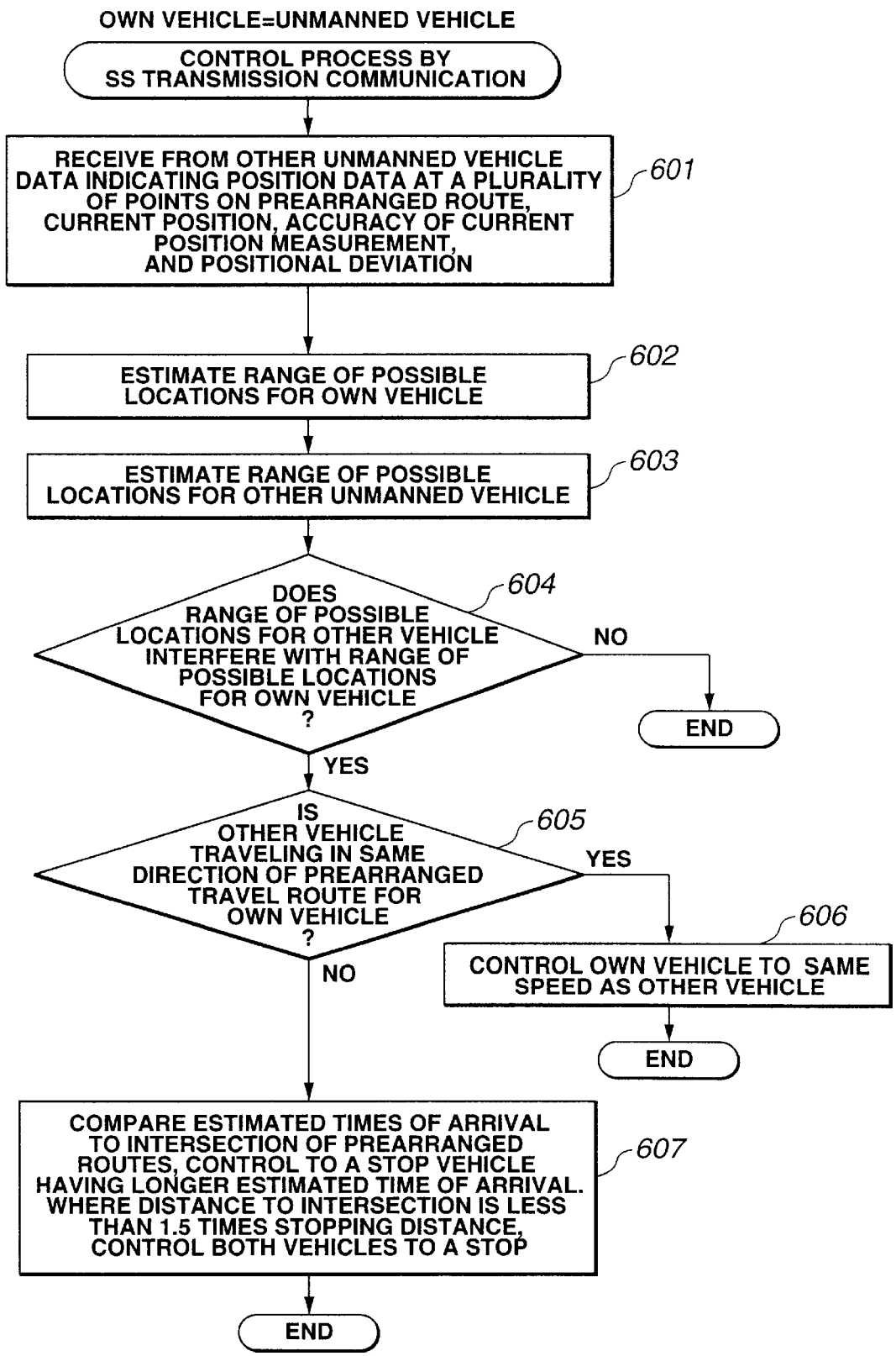
FIG. 15 is a flow chart showing a process operation by SS transmission.

Referring to FIG. 15, an own vehicle (unmanned vehicle) is transmitted from another vehicle (unmanned vehicle) data indicating current vehicle position, position data at a plurality of points on an arranged route, accuracy of current position measurement, and deviation (STEP 601), and estimates a range of possible locations for the own vehicle (STEP 602) and a range of possible locations for the other vehicle (STEP 603).

Specifically, for the own vehicle, the range of possible locations is estimated as a path connecting a plurality of points on a prearranged travel route, of width including latitude for position measurement accuracy, positional deviation, and vehicle width, and for the other unmanned vehicle, the range of possible locations is estimated as a path connecting a plurality of points on a prearranged travel route, of width including latitude for position measurement accuracy, positional deviation, and vehicle width.

Once ranges of possible location for the vehicles have been computed in this way, a decision is made as to whether the range of possible locations for the other vehicle interferes with the range of possible locations for the own vehicle (STEP 604), and in the event that these ranges interfere with each other, a decision is made as to whether the other vehicle is traveling in the same direction on the arranged route for the own vehicle (STEP 605).

In STEP 605, where the other vehicle is traveling in the same direction, there exists the risk that the own vehicle will overtake the other vehicle, so the speed of the own vehicle is controlled to the same speed as the other vehicle by vehicle control device 44 (STEP 606).

In STEP 605, where the other vehicle is not traveling in the same direction, there exists the risk of collision between the other vehicle and the own vehicle, so the estimated times of arrival to the intersection of the arranged routes are compared, and the vehicle having the longer estimated time of arrival is controlled to a stop. Where the distance to the intersection is less than 1.5 times the stopping distance, both vehicles are controlled to a stop (STEP 607).

To describe the processes described in FIGS. 14 and 15 in other terms, where the range of possible locations for an own vehicle and the range of possible locations for another vehicle interfere, and the other vehicle is traveling in the same direction on the arranged route of the own vehicle, there exists a risk that the own vehicle will overtake the other vehicle.

To prevent interference with the other vehicle in such cases, in the own vehicle, under the control of vehicle control device 44, the speed of the own vehicle is controlled to the same speed as the other vehicle.

Where the range of possible locations of the other vehicle interferes with the range of possible locations of the own vehicle, and the other vehicle is not traveling in the same direction on an arranged route, there exists a risk of collision between the vehicles.

To prevent collision between the vehicles, where the other vehicle is a manned vehicle, the own vehicle is controlled to a stop under the control of vehicle control device 44, and an Alarm signal is transmitted to the other vehicle via inter-vehicle communication device 6.

Where the other vehicle is an unmanned vehicle, the estimated times of arrival to the intersection of the arranged routes are compared, and the vehicle having the longer estimated time of arrival is controlled to a stop, or where the distance to the intersection is less than 1.5 times the stopping distance, both vehicles are controlled to a stop.

Typically, the position of the other vehicle is updated at given time (15-second) intervals, and the size of the range of possible locations thereof is reduced.

Where vehicles are situated in proximity to each other, highly accurate position information can be obtained by SS transmission, thus preventing any interference between the ranges of possible locations.

If by some fluke both UHF communication and SS communication should be disabled (inter-vehicle communication devices experience malfunction, the range of possible locations for the other vehicle will continue to expand so that the range of possible locations for the other vehicle interferes with the range of possible locations for the own vehicle.

When a manned vehicle has completed its course and will be shut down, it is necessary to move it to a safe area lying outside the unmanned vehicle movement area before shutting it down. At shutdown, vehicle controller 55 and communication devices 5,6 are supplied with backup power by backup power supply 54 and continue to function, with vehicle controller 55 stopping the manned vehicle, and a signal to the effect that "this vehicle has been shut down", "the vehicle ID of that vehicle", and "position data for that vehicle" being sent to monitoring station 20 via monitoring station/vehicle communication device 5.

At monitoring station 20 the transmitted data is stored, and other vehicles are controlled so as to prevent them from entering this position (area) based on that position data; at the same time, the signal to the effect that "the manned vehicle has been shut down" and "the vehicle ID of the manned vehicle" are transmitted to all vehicles via monitoring station/vehicle communication device 5.

Vehicles receiving this signal to the effect that "the manned vehicle has been shut down" proceed to terminate the interference estimation process (i.e., calculating a range of possible locations after a predetermined time interval assuming movement at maximum speed) for the manned vehicle.

Whereas the present embodiment describes a vehicle interference estimation process that assumes the own vehicle is an unmanned vehicle, basically the same process would be used where the own vehicle is a manned vehicle.

As noted, according to the present embodiment, for long-distance communication there is an extended time interval (15 seconds, for example) for position information, whereby it is possible to make adjustments for insufficient communication capacity. In other words, the load on the communications circuit can be controlled.

Since each vehicle estimates vehicle interference taking into account information pertaining to other vehicle position and reception time, measurement time, or transmission time, the likelihood of interference can be determined accurately despite the extended (coarse) time interval for position information.

To prevent interference with a manned vehicle, which may not always travel as-planned on a predetermined prearranged travel route, an unmanned vehicle will take measures such as halting the own vehicle or transmitting an alarm to the manned vehicle, thereby avoiding collision or the like.

This obviates the need for the human operator to drive a manned vehicle so as to travel as-planned along a predetermined travel route, thereby allowing the operator to travel along the prearranged travel route on his or her own volition. Thus, the manned vehicle can be employed efficiently for work, even in situations where both manned vehicles and unmanned vehicles are present on the work site.

EMBODIMENT 2

This second embodiment assumes a vehicle monitoring system like that described in the first embodiment: the arrangement of the communications system in this vehicle monitoring system is basically the same as the arrangement shown in FIG. 2, the device arrangement on-board unmanned vehicles is basically the same as the arrangement shown in FIG. 3, and the device arrangement on-board manned vehicles is basically the same as the arrangement shown in FIG. 4.

This second embodiment, however, differs from the first embodiment in that there exists the possibility that a manned vehicle depicted in FIG. 4 will escort an "ordinary" manned vehicle (namely, a manned vehicle lacking a position-measuring device, communication devices, etc.) as it travels along a prearranged travel route; in that monitoring station 20 function is slightly modified so as to enable this escorted travel; and in that the vehicle range of possible locations estimation process is slightly modified.

These points of difference are described below.

Firstly, the escorting manned vehicle (the manned vehicle depicted in FIG. 4) is defined as the escorting vehicle, and the manned vehicle being escorted by the escorting vehicle is defined as the escorted vehicle.

As this escorted vehicle (a repair vehicle, for example) lacks a position-measuring device, communication devices, etc., while the human operator can visually recognize other vehicles on a large work site such as a mining operation, unmanned vehicles cannot recognize it. Thus, if such a vehicle were to travel unescorted around a large work site, there would be a risk of collision with unmanned vehicles. Accordingly, by having escort vehicle escort the escorted vehicle around, the escorted vehicle may move about in safety.

The escort vehicle (manned vehicle 11 in FIG. 1, for example) comprises a mode switch for switching between a guiding mode (escort mode) in which it guides an escorted vehicle, and a non-guiding mode (non-escort mode) in which it is not guiding a vehicle.

Mode information set by the mode switch is transmitted to monitoring station 20 via monitoring station/vehicle communication device 5.

Where the mode information received from escort vehicle 11 via monitoring station/vehicle communication device 23 indicates non-escort mode, monitoring station 20 transmits instruction data to unmanned vehicles via monitoring station/vehicle communication device 23, instructing them not to enter a range of possible locations which includes the current position of escort vehicle 11, calculated by a process described later.

On the other hand, where escort mode is indicated, the monitoring station transmits instruction data to unmanned vehicles via monitoring station/vehicle communication device 23, instructing them not to enter a range of possible locations which includes the current position of escort vehicle 11, calculated by a process described later, as well as a range of possible locations which includes the current position of an escorted vehicle being escorted by escort vehicle 11, calculated by a process described later.

Turning now to the process for estimating a range of possible locations for another vehicle (manned vehicle) performed by each vehicle (both manned vehicles and unmanned vehicles), the estimation process may be carried out by either of two methods, a circle computation method or a course computation method, which are now described.

In the present embodiment, let it be assumed that the own vehicle, namely, the vehicle computing a range of possible locations for other vehicle, is an unmanned vehicle (unmanned vehicle 10, for example; in actual practice, it does not matter if the vehicle is a manned vehicle or unmanned vehicle), and that the other vehicle whose range of possible locations is being computed is a manned vehicle {escort vehicle (manned vehicle 11, for example) only, or an escort vehicle plus an escorted vehicle (such as a repair vehicle)}.

Method 1: Circle Computation Method

On the basis of a plurality of position data for manned vehicle 11 indicating its path of movement (prearranged travel route) received via inter-vehicle communication device 6, unmanned vehicle 10 calculates a circle—on the assumption of travel at maximum speed to a predetermined future point in time—and assumes the area within this circle to be the range of possible locations (estimated range of motion or estimated range of possible locations) for the escort vehicle or the escorted vehicle.

Specifically, referring to FIG. 16, on the basis of position data indicating the last reported vehicle position P (latest position data), the range of possible locations for escort vehicle 11 is designated to be a circle 80 of radius r equivalent to the distance over which it can travel at maximum speed from this vehicle position P (i.e., estimated range of motion).

The range of possible locations for the escorted vehicle consists of an area (i.e., estimated range of motion) defined by circles 81, 82 of radii equal to the distances traveled at maximum speed from a point P1, lying within a predetermined distance from position P—the last reported vehicle position for which information has been received from escort vehicle 11—defined as the escort area, and another point P2, respectively.

Out of safety considerations during travel, the escorted vehicle is escorted maintaining a given distance between vehicles (a distance such that the vehicles can visually recognize each other), and thus circles 81, 82 partly overlap circle 80.

Method 2: Course Computation Method

On the basis of a plurality of position data for manned vehicle 11 indicating its path of movement (prearranged travel route) received via inter-vehicle communication device 6, unmanned vehicle 10 calculates positions on the prearranged travel route on the assumption that the manned vehicle will travel at maximum speed along the prearranged travel route (course) to a predetermined future point in time, and assumes the area between these positions and the last reported vehicle position to be the range of possible locations for the manned vehicle.

Specifically, referring to FIG. 17, on the basis of position data indicating the last reported vehicle position P (latest position data) received via the inter-vehicle communication device 6, positions 60a, 60b on prearranged travel route 60 are calculated—assuming movement of the manned vehicle at maximum speed along prearranged travel route up to a predetermined future point in time—and the range of possible locations for the escort vehicle is assumed to be the area 90 on the prearranged travel route lying between these positions 60a, 60b and the last reported vehicle position P (i.e., estimated range of motion).

The range of possible locations for the escorted vehicle is determined by computing a position on the prearranged travel route assuming travel at maximum speed from a point P1, lying within a predetermined distance from position P—representing the last reported vehicle position for which information has been received from escort vehicle 11—defined as the escort area, and another point P2, respectively (this position lies within area 90), designating the area 91 lying between this position and points (positions) P1, P2 as the range of possible locations (namely, estimated range of locations).

Unmanned vehicle 10—which calculates a range of possible locations for the manned vehicle in this way—receives from monitoring station 20 mode information and the vehicle ID for the manned vehicle, as well as appropriate instruction data for the mode information. Unmanned vehicle 10 is then managed and controlled by monitoring station 20 so as to prevent it from entering the range of possible locations of the manned vehicle.

Specifically, when the mode of the escort vehicle (manned vehicle 11) is non-escort mode, unmanned vehicle 10 is managed and controlled so as to prevent it from entering—where Method 1 is used—a range of possible locations 80, or—where Method 2 is used—a range of possible locations 90; conversely, in escort mode, it is managed and controlled so as to prevent it from entering—where Method 1 is used—a range of possible locations 80 and ranges of possible locations 81, 82, or—where Method 2 is used—a range of possible locations 90 and range of possible locations 91.

In other words, this means that prearranged travel routes lying outside of ranges of possible locations calculated in the preceding manner are designated as permissible travel ranges.

A range of possible locations for a manned vehicle can also be estimated using a combination of the two methods. For example, Method 1 can be used for long distances and Method 2 used for shorter distances. Alternatively, rather than plotting a circular range of possible locations using Method 1, one may plot an ellipse having greater extension in the direction of forward advance of the vehicle from the position of the other vehicle. That is, one may plot an ellipse having the direction of forward advance of the vehicle as its major axis.

When using the circle computation of Method 1, there exists a risk that the estimated future range of possible locations for the other vehicle may interfere with the own vehicle if the distance between the two vehicles has been shortened by passing by each other, for example. This may be avoided by employing Method 2; or by instead employing Method 1 for long distances, while for shorter distances transmitting to the other vehicle, by means of SS transmission, direction of advance information and predicted route information in addition to position information, so as to provide a more precise estimate of range of possible locations.

In the second embodiment the escorted vehicle is a repair vehicle, but this is not a limiting example, other examples being a dump truck, wheel loader, hydraulic shovel, or other work vehicle lacking a position-measuring function and communications function.

As noted, according to the second embodiment, an escort vehicle (manned vehicle) exchanges data with manned vehicles and unmanned vehicles having position-measuring devices and communication devices and with a monitoring station, while escorting an escorted vehicle (manned vehicle) lacking a position-measuring device and communication devices, allowing the escorted vehicle to be conducted safely about a large work site such as a mining operation.

Since the escort vehicle travels while guiding the escorted vehicle, the need to provide all manned vehicles with position-measuring devices and communication devices is obviated, so initial outlays can be reduced.

In the event that a position-measuring device or communication device on board a manned vehicle should malfunction, making communication with other vehicles and the monitoring station impossible, the manned vehicle will nevertheless be able to travel safely about a large work site such as a mining operation, guided by another manned vehicle whose devices are functioning normally.

EMBODIMENT 3

This third embodiment assumes a vehicle monitoring system like that described in the first embodiment: the arrangement of the communications system in this vehicle monitoring system is basically the same as the arrangement shown in FIG. 2, the device arrangement on-board unmanned vehicles is basically the same as the arrangement shown in FIG. 3, and the device arrangement on-board manned vehicles is basically the same as the arrangement shown in FIG. 4.

This third embodiment, however, differs from the first embodiment in that the vehicle interference process is slightly modified.

Specifically, the present embodiment is premised on the own vehicle being a manned vehicle and the other vehicles being either manned vehicles or unmanned vehicles, with vehicle interference prevented through exchange of data among these vehicles.

The process by which a manned vehicle estimates a range of possible locations for another manned vehicle or unmanned vehicle in order to prevent this manned vehicle from interfering with another manned vehicle or unmanned vehicle is now described. There are two methods: a circle computation method (see FIG. 6) and a course computation method (see FIG. 7), which, having been described previously in EMBODIMENT 1, are not discussed in detail here.

Exchange of data between vehicles close enough that communication by SS transmission is possible, and estimation by these vehicle of ranges of possible locations for themselves and for the other vehicle, are accomplished in the manner described previously in EMBODIMENT 1.

Specifically, as regards data exchange, an unmanned vehicle transmits to other vehicles position data indicating its current vehicle position as well as a prearranged travel route in the form of position data for a plurality of points on the prearranged travel route. At the same time, data indicating current position measurement accuracy and positional deviation is transmitted to the other vehicles.

A manned vehicle, meanwhile, transmits to other vehicles position data indicating its current vehicle position and information concerning the direction of advance. At the same time, data indicating the current position measurement accuracy, data indicating positional deviation from the course, and data indicating angular deviation from an indicated direction on the course are transmitted to other vehicles.

For an unmanned vehicle, the range of possible locations is estimated as a path connecting a plurality of points on a prearranged travel route, of width including latitude for position measurement accuracy, positional deviation, and vehicle width. For a manned vehicle, on the other hand, the range of possible locations is estimated as a circle centered on the current position, of diameter including latitude for position measurement accuracy and vehicle width.

In manned vehicles, ranges of possible locations for the aforementioned manned vehicles or unmanned vehicles, namely, the information depicted in FIGS. 6, 7, 16, and 17, is displayed on the display screen of a display device 52a.

In the present embodiment as well, the vehicle interference prevention process is basically the same as the process described with reference to FIGS. 8–12, 14, and 15.

However, in this case own vehicle="unmanned vehicle" is redefined as own vehicle="manned vehicle". STEP 406 of the process shown in FIG. 12 now consists of lighting the red lamp of indicator light 52b to display the warning "Stop: approaching unmanned vehicle." That is, when there is interference between the range of possible locations— computed for a predetermined time in the future (5 seconds for example)—for a vehicle that cannot communicate through SS transmission (an unmanned vehicle, for example) and the range of possible locations—computed for a predetermined time in the future (5 seconds for example)—for the own vehicle (manned vehicle), the red lamp in the own vehicle lights up to provide a warning display.

The control process by SS transmission in FIGS. 14 and 15 also differs slightly, and accordingly is described hereinbelow. In this process, there are two procedures, depending on whether the other vehicle is a manned vehicle or an unmanned vehicle; the case of a manned vehicle is described first, followed by that for an unmanned vehicle.

Other Vehicle=Manned Vehicle

Figure 18:
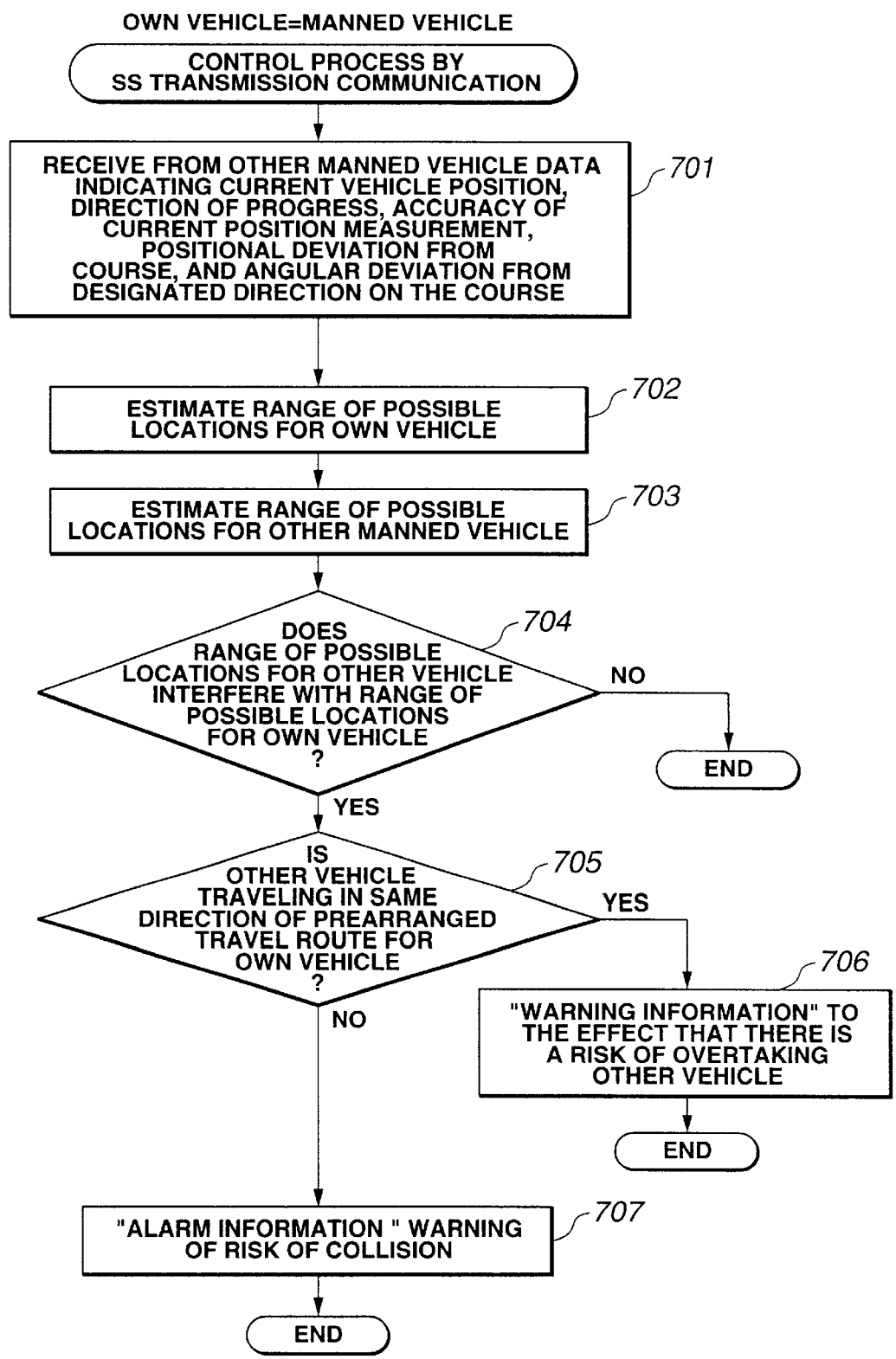
FIG. 18 is a flow chart showing a process operation by SS transmission in a third embodiment.

Referring to FIG. 18, an own vehicle (manned vehicle 11, for example) receives from another manned vehicle (manned vehicle 13, for example) data indicating current position, direction of progress, accuracy of current position measurement, deviation from course, and angular deviation from the stipulated direction on the course (STEP 701), and estimates a range of possible locations for itself (STEP 702) and a range of possible locations for the other manned vehicle 13 (STEP 703).

Specifically, the range of possible locations for own vehicle 11 is estimated as a path connecting a plurality of points on a prearranged travel route based on course data, of width including latitude for position measurement accuracy, positional deviation, and vehicle width. The range of possible locations for the other manned vehicle 13 is estimated as a circle centered on the current position, of diameter including latitude for position measurement accuracy and vehicle width.

Once ranges of possible locations for the vehicles have been calculated in this manner, a determination is made as to whether the range of possible locations for the other vehicle interferes with the range of possible locations for the own vehicle (STEP 704), and where the ranges of possible locations interfere, a determination is made as to whether the other vehicle is traveling in the same direction on the prearranged travel route for the own vehicle (STEP 705).

In STEP 705, if the other vehicle is traveling in the same direction, there is issued Warning information to the effect that there is a risk of overtaking the other vehicle (STEP 706), whereas if the other vehicle is not traveling in the same direction, there is issued Alarm information warning of the risk of collision with the other vehicle (STEP 707).

Specific examples of Warning information are, for example, a display on the display screen of display device 52a to the effect that "there is a risk of overtaking the other vehicle," or lighting up of the yellow lamp of indicator light 52b. A combination of the above is also possible.

Specific examples of the above-mentioned Alarm information would be, for example, a display on the display screen of display device 52a to effect that "there is a risk of collision with another vehicle", for example; lighting up of the red lamp of indicator light 52b; or a buzzer sound emitted by an alarm buzzer 52c. Combinations of the above are also possible.

Other Vehicle=Unmanned Vehicle

Figure 19:
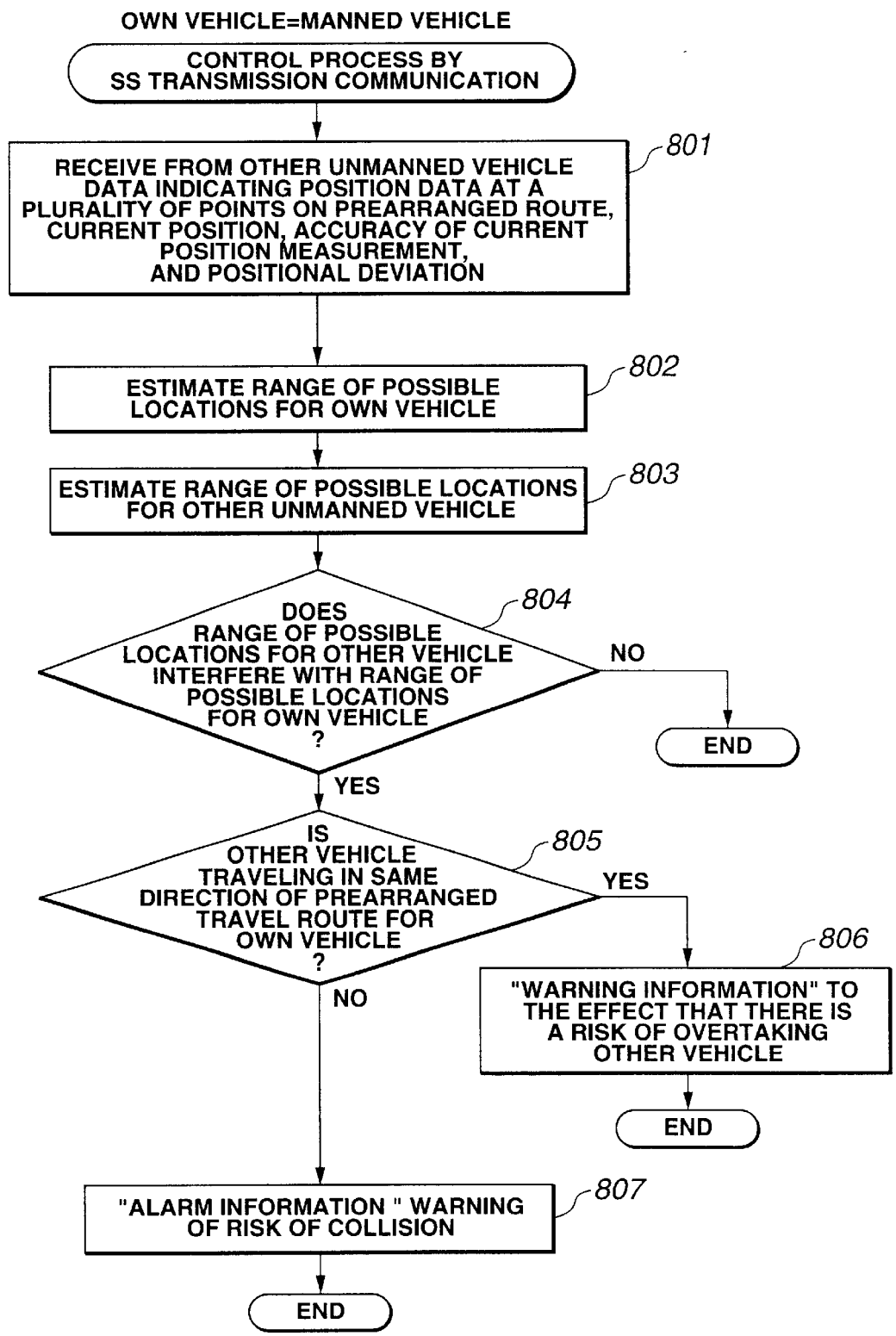
FIG. 19 is a flow chart showing a process operation by SS transmission in a third embodiment.

Referring to FIG. 19, an own vehicle (manned vehicle 11, for example) receives from another unmanned vehicle (unmanned vehicle 10, for example) data indicating current vehicle position, position data at a plurality of points on an arranged route, accuracy of current position measurement, and deviation (STEP 801), and estimates a range of possible locations for itself (STEP 802) and a range of possible locations for the other unmanned vehicle (STEP 803).

Specifically, for the own vehicle 11, the range of possible locations is estimated as a path connecting a plurality of points on a prearranged travel route, based on course data, of width including latitude for position measurement accuracy, positional deviation, and vehicle width. For the other unmanned vehicle 12, the range of possible locations is estimated as a path connecting a plurality of points on a prearranged travel route, of width including latitude for position measurement accuracy, positional deviation, and vehicle width.

Subsequently, processes analogous to those described previously in STEPS 704–707 are performed (STEPS 804–807).

To describe the processes described in FIGS. 18 and 19 in other terms, where the range of possible locations for another vehicle interferes with the range of possible locations for an own vehicle and, and the other vehicle is traveling in the same direction on the arranged route of the own vehicle, there exists a risk that the own vehicle will overtake the other vehicle. To prevent interference with the other vehicle in such cases, the Warning information described earlier is issued in the own vehicle.

Where the range of possible locations of the other vehicle interferes with the range of possible locations of the own vehicle, and the other vehicle is not traveling in the same direction on the arranged route for the own vehicle, there exists a risk of collision between the vehicles. To prevent collision between the vehicles, the Warning information described earlier is issued in the own vehicle.

As noted, according to EMBODIMENT 3, in a manned vehicle, the relative positional relationship of the own vehicle (manned vehicle) and another vehicle, as well as the range of possible locations for this other vehicle, are displayed on a screen in the manned vehicle, thereby allowing the human operator of the manned vehicle (own vehicle) to ascertain before the fact the likelihood that, on the current course, the vehicles will interfere, for example, so that interference between the vehicles can be avoided.

Even in the event that a human operator should fail to notice the information displayed on the screen display, since indicator light 52b lights the red lamp and the warning buzzer 52c sounds, the operator will be apprised of the situation and can manually stop the vehicle or move it to a safe location in order to avoid the risk of a collision.

Further, where operations are being carried out at a mine situated in the high mountains, etc., where, for example, visibility is impaired by mist, since the relative positional relationship of the own vehicle (manned vehicle) and another vehicle are displayed on a screen, a human operator can ascertain before the fact the likelihood that vehicles will interfere, for example, so that interference between the vehicles can be avoided.

What is claimed is:

1. A vehicle interference prevention system including an unmanned vehicle comprising vehicle position-measuring means for measuring a position of its own vehicle and traveling over a travel route based on predetermined instruction data, a first manned vehicle having position-measuring means for measuring a position of its own vehicle, and a second manned vehicle traveling over the travel route guided by the first manned vehicle;

wherein the unmanned vehicle and the first manned vehicle each comprises communication means for transmitting and receiving predetermined information among themselves;

the first manned vehicle transmits to the unmanned vehicle via the communication means a mode which is either a guiding mode wherein the second manned vehicle is guided, or a non-guiding mode wherein the second manned vehicle is not guided; and transmits to the unmanned vehicle via the communication means position information indicating the vehicle position determined by the position-measuring means; and the unmanned vehicle, in the event that the mode received via the communication means is the non-guiding mode, is controlled, on the basis of the position information from the first manned vehicle, in such a way as to avoid entering an area of a given range that includes a current position of the first manned vehicle; whereas in the case of the guiding mode, it is controlled, on the basis of the position information from the first manned vehicle, in such a way as to avoid entering the current position of the first manned vehicle and an area of a given range lying to a rear of the first manned vehicle.

2. The vehicle interference prevention device according to claim 1, further comprising a monitoring station having transmitting/receiving means for transmitting and receiving predetermined information to and from the unmanned vehicle and the first manned vehicle; and the monitoring station further comprises means for transmitting to the unmanned vehicle via the transmitting/receiving means instruction data designating as a permissible travel range over which travel is permitted an area on the travel route such that the most recent position of the unmanned vehicle, based on the position information measured by the vehicle position-measuring means and received via the transmitting/receiving means, does not interfere with a predicted range of motion for the first manned vehicle, as calculated on the basis of the most recent position information for the first manned vehicle received via the transmitting/receiving means.

3. The vehicle interference prevention device according to claim 2, wherein the transmitting means, in the event that the first manned vehicle is currently in the guiding mode, includes in the permissible travel range a predicted range for the second manned vehicle that is obtained on the basis of the position information for the second manned vehicle, the position information for the second manned vehicle being obtained on the basis of the position information for the first manned vehicle, and transmits to the unmanned vehicle instruction data designating an area of this range as a new permissible travel range.

4. The vehicle interference prevention device according to claim 1, wherein the unmanned vehicle comprises:

measuring means for measuring the position of its own vehicle;

decision means for deciding, on the basis of the position information from the first manned vehicle received from the communication means and position information indicating the position of its own vehicle as measured by the measuring means, whether its own vehicle poses interference with the first manned vehicle or with an area of a predetermined range extending from the position of the first manned vehicle; and control means that, in the event that the decision means decides that interference is present, halts or decelerates its own vehicle.

5. A vehicle interference prevention device for preventing interference among vehicles where a plurality of vehicles are traveling over a travel route, wherein each of the plurality of vehicles comprises:

measuring means for measuring a position of its own vehicle;

communication means for exchanging with other vehicles, in a wireless communications format, position information indicating the position of its own vehicle, as measured by the measuring means;

estimating means for determining an existence possibility area of the other vehicle by using position information for the other vehicle received via the communication means, time information indicating a reception time at which the position information is received and an upper limit speed of the other vehicle, and estimating a likelihood of interferences between its own vehicle and the other vehicle on the basis of the determined existence possibility area and the position information for its own vehicle;

control means for performing an avoiding control routine of its own vehicle in the event that interference is predicted by the estimating means, so as to avoid interference with the other vehicle; and processing means that, during power-on of its own vehicle, notifies the other vehicle that its own vehicle has started up, and in the event that no response to the notification is received by its own communication means, makes a determination that the communication means of the other vehicle is not functioning normally, and places its own vehicle in standby mode at its current position.

6. A vehicle interference prevention device for preventing interference among vehicles where a plurality of vehicles are traveling over a travel route, wherein each of the plurality of vehicles comprises:

measuring means for measuring a position of its own vehicle;

communication means for exchanging with other vehicles, in a wireless communications format, position information indicating the position of its own vehicle, as measured by the measuring means, the communication means including means for transmitting and receiving to and from the other vehicle, in a wireless communications format, position information indicating a vehicle position, as measured by its own measuring means, and time information indicating a time of measurement of the vehicle position or time information indicating a time of transmission of the position information;

estimating means for determining an existence possibility area of the other vehicle by using position information for the other vehicle received via the communication means, time information indicating a reception time at which the position information is received and an upper limit speed of the other vehicle, and estimating a likelihood of interferences between its own vehicle and the other vehicle on the basis of the determined existence possibility area and the position information for its own vehicle, the estimating means including means for estimating the likelihood of interference between its own vehicle and the other vehicle on the basis of the position information for the other vehicle received via the transmitting/receiving means, the time information for either the measurement time or the transmission time, and the position information for its own vehicle;

control means for performing an avoiding control routine of its own vehicle in the event that interference is predicted by the estimating means, so as to avoid interference with the other vehicle; and processing means that, during power-on of its own vehicle, notifies the other vehicle that its own vehicle has started up, and in the event that no response to the notification is received by its own communication means, makes a determination that the communication means of the other vehicle is not functioning normally, and places its own vehicle in standby mode at its current position.

7. A vehicle interference prevention device for preventing interference among vehicles where a plurality of vehicles are traveling over a travel route, wherein each of the plurality of vehicles comprises:

measuring means for measuring a position of its own vehicle;

communication means for exchanging with other vehicles, in a wireless communications format, position information indicating the position of its own vehicle, as measured by the measuring means;

estimating means for determining an existence possibility area of the other vehicle by using position information for the other vehicle received via the communication means, time information indicating a reception time at which the position information is received and an upper limit speed of the other vehicle, and estimating a likelihood of interferences between its own vehicle and the other vehicle on the basis of the determined existence possibility area and the position information for its own vehicle, the estimating means comprises:

first estimating means for estimating, on the basis of the position information and the time information for other vehicle received via the communication means, a future position of the other vehicle at a point in time coming a predetermined time interval after the reception time, or a range of movement of the other vehicle;

second estimating means for estimating from its current position on the basis of position information for its own vehicle a future position of its own vehicle at a point in time coming a predetermined time interval later, or a range of movement of its own vehicle; and decision means for deciding if the future position or range of movement of the other vehicle estimated by the first estimating means overlaps the current position or future position of its own vehicle estimated by the second estimating means;

control means for performing an avoiding control routine of its own vehicle in the event that interference is predicted by the estimating means, so as to avoid interference with the other vehicle; and processing means that, during power-on of its own vehicle, notifies the other vehicle that its own vehicle has started up, and in the event that no response to the notification is received by its own communication means, makes a determination that the communication means of the other vehicle is not functioning normally, and places its own vehicle in standby mode at its current position.

* * * * *